(12) United States Patent
Takagi et al.

(10) Patent No.: US 6,630,749 B1
(45) Date of Patent: Oct. 7, 2003

(54) AUTOMOBILE POWER SOURCE MONITOR

(75) Inventors: Kouichi Takagi, Nagoya (JP); Takeshi Endoh, Nagoya (JP); Kazuhiro Aoki, Toyota (JP); Satoshi Nakagawa, Toyota (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/721,952

(22) Filed: Nov. 27, 2000

(30) Foreign Application Priority Data

Nov. 29, 1999 (JP) .......................................... 11-337594
Nov. 29, 1999 (JP) .......................................... 11-337599

(51) Int. Cl.$^7$ ............................................... H02H 7/18
(52) U.S. Cl. ...................................... 307/10.7; 340/428
(58) Field of Search .................................. 307/9.1, 10.1, 307/10.7, 38, 39, 30; 340/428, 438, 474; 320/132; 702/63

(56) References Cited

U.S. PATENT DOCUMENTS

| | | | |
|---|---|---|---|
| 4,218,717 A | | 8/1980 | Shuster |
| 4,247,813 A | * | 1/1981 | Gansert et al. ................ 322/99 |
| 4,679,000 A | | 7/1987 | Clark |
| 4,733,100 A | * | 3/1988 | Nusairat et al. ............. 307/9.1 |
| 4,950,913 A | | 8/1990 | Kephart |
| 5,204,991 A | * | 4/1993 | Law .......................... 307/10.7 |
| 5,335,273 A | * | 8/1994 | Takagi et al. ........... 379/433.01 |
| 5,355,273 A | * | 10/1994 | Yoshizawa et al. ........ 361/93.8 |
| 5,793,189 A | * | 8/1998 | Kawaguchi et al. ........ 320/125 |
| 6,144,110 A | * | 11/2000 | Matsuda et al. ........... 307/10.1 |
| 6,299,263 B1 | * | 10/2001 | Uematsu et al. ............ 303/192 |

* cited by examiner

*Primary Examiner*—Brian Sircus
*Assistant Examiner*—Sharon A. Polk
(74) *Attorney, Agent, or Firm*—Oliff & Berridge

(57) ABSTRACT

The automobile power source monitor is provided with: a breaker 11 mounted in the feeding path through which the electric power from the battery 1 is fed to the electric devices through the feed sockets A1–Am provided in the car; an engine stop detecting circuit 16 to detect the stop of the engine according to the L signal of the regulator IC 19, and to shut down the breaker 11 through the driving circuit 17; an over current detecting circuits C1–Cm to detect the over current according to the detecting values of the current detecting circuits B1–Bm, and to shut down the breaker 11; an idling-up instruction circuit 13 to detect the increase of the feeding current, and to instruct the idling-up; and a low voltage detecting circuit 15 to detect the lowering of the output voltage of the battery 1 and to shut down the breaker 11.

14 Claims, 9 Drawing Sheets

AUTOMOBILE POWER SOURCE MONITOR

BACKGROUND OF THE INVENTION

The present invention relates to an automobile power source monitor to monitor an electric power supply condition when the electric power from a battery is supplied to electric devices though a feed socket provided in a car.

Recently, in the room of the automobile, cases are increased in which electrical goods (electric devices), such as a television receiver, ice box, hot box, or cleaner, are used. Generally, the power source for such the electrical goods is obtained from a feed socket such as a cigar lighter socket or an accessory socket provided for exclusive use of power supply. Accordingly, there is a tendency in which the power supply amount to the electrical goods from the battery is increased. Therefore, it is necessary that the power supply condition to the electrical goods is monitored for the battery protection, and the power supply is shut down as needed.

As an example of the conventional proposal to this, an automobile power source monitor in which, when the current amount supplied from the feed socket is increased, it is detected, and the idling-up is indicated to an engine control unit to cope with this, and a power generation amount of an alternator is increased, thereby, the consumption of the battery is prevented, is proposed.

However, in the example of the proposal, when a feed system in which the feed socket can be used even in the condition in which the engine is stopped (the condition that an ignition switch is in an accessory mode, or the like), is employed, even when the feed socket is used during the engine stop, because the idling-up can not be conducted corresponding to that, the battery energy consumption at the time of engine stop can not be prevented.

Further, as another example of a proposal to this, an automobile power source monitor to monitor the electric power supply condition to the electrical devices through the feed socket is provided, and thereby, the protection and control of the battery power source is conducted. As a main function (power source control operation) of this power source monitor, there is a function to shut down the power supply from the feed socket when the supply current value from the feed socket is the over current, or when the output voltage of the battery is lowered lower than a predetermined level, or a function to output an idling-up instruction to the engine control unit when the supply current value from the feed socket exceeds a predetermined idling-up reference, in order to prevent the consumption of the battery.

However, in the above example of the proposal, because the power source control operation such as the shutdown of the feed socket or the idling-up, is conducted without any reporting to the user, there is a case in which the user does not aware that the power source control operation such as the shutdown of the feed socket, is conducted. Specifically, when the idling-up is conducted, from the view point of the fuel saving and the exhaust gas suppression, although it is preferable that the power consumption is suppressed, in the example of the proposal, there is a problem that the user does not aware that the idling-up is conducted, and the power consumption is continued.

SUMMARY OF THE INVENTION

Accordingly, in view of the foregoing problems, an object of the present invention is to provide an automobile power source monitor by which the feed socket can not be used during the engine stop, and the consumption of the battery energy at the time of engine stop can be assuredly prevented.

A technical means for attaining the object is as follows: an automobile power source monitor by which a power supply condition when the electric power from a battery is supplied to electric devices through a feed socket provided in a car, is monitored, the automobile power source monitor is characterized in that: on a feeding path between the battery and the feed socket, a shutdown section provided so as to shut down the feeding path; and an engine stop detecting section which is provided so that the engine stop can be detected, and when the engine stop is detected, the feeding path is shut down by the shutdown section according to this, are provided.

Preferably, when the engine stop detecting section detects the engine stop, it starts a counting operation for a predetermined time according to that, and as the counting operation of the predetermined time is completed, the feeding path is shut down by the shutdown section.

Further, preferably, the automobile power source monitor is further provided with a current detecting section to detect the value of the current flowing through the feed socket, and as the engine stop detecting section detects the stop of the engine, the current value detected by the current detecting section is integrated as the time passes, and as the integration value exceeds a predetermined reference value, the feeding path is shut down by the shutdown section.

Further, preferably, the engine stop detecting section detects the stop of the engine according to an output signal of a regulator IC.

Further, preferably, the engine stop detecting section detects the stop of the engine by detecting the switching from an ON mode to indicate the operation continuance of the engine of an ignition switch to another mode to indicate the stop of the engine.

Further, in view of the foregoing problems, another object of the present invention is to provide an automobile power source monitor by which the user can recognize that the power source control operation such as the shut down of the feed socket or idling-up is conducted, and can take an appropriate measure to meet the situation.

A technical means for attaining the object is as follows.

An automobile power source monitor by which a power supply condition when the electric power from a battery is supplied to electric devices through a feed socket provided in a car, is monitored, the automobile power source monitor is characterized in that: on a feeding path between the battery and the feed socket, a shutdown section provided so as to shut down the feeding path; a current detecting section to detect the current value flowing to the electric devices through the feed socket; an annunciation section by which at least any one of a sound or a light can be outputted; the first shutdown control section which judges whether the current value detected by the current detecting section is the over current, and when it is judged to be the over current, which makes the shutdown section shut down the feeding path; and annunciation control section to output the first annunciation output though the annunciation section, corresponding to the shutdown of the shutdown section by the fist shutdown control section, are provided.

Further, the technical means for attaining the object is as follows.

An automobile power source monitor by which a power supply condition when the electric power from a battery is supplied to electric devices through a feed socket provided in a car, is monitored, the automobile power source monitor is characterized in that: on a feeding path between the battery and the feed socket, a shutdown section provided so as to shut down the feeding path; a voltage detecting section to detect the output voltage of the battery; an annunciation section by which at least any one of a sound or a light can be outputted; the second shutdown control section which judges whether the voltage value detected by the voltage detecting section is lowered lower than a predetermined reference level, and which makes the shutdown section shut down the feeding path when it is judged to be lower; and an annunciation control section to output the first annunciation output through the annunciation section, corresponding to the shutdown of the shutdown section by the second shutdown control section, are provided.

Further, the technical means for attaining the object is as follows.

An automobile power source monitor by which a power supply condition when the electric power from a battery is supplied to electric devices through a feed socket provided in a car, is monitored, the automobile power source monitor is characterized in that: a current detecting section to detect the current value flowing to the electric devices through the feed socket; an annunciation section by which at least any one of a sound or a light can be outputted; an idling-up instruction section to judge whether the current value detected by the current detecting section is over than a predetermined idling-up reference, and to output the idling-up instruction to an engine control unit when it is judged to be over; and an annunciation control section to output the second annunciation output through the annunciation section, corresponding to the output of the idling-up instruction by the idling-up instruction section, are provided.

Further, the technical means for attaining the object is as follows.

An automobile power source monitor by which a power supply condition when the electric power from a battery is supplied to electric devices through a feed socket provided in a car, is monitored, the automobile power source monitor is characterized in that: an annunciation section by which at least any one of a sound or a light can be outputted; an engine stop detecting section which is provided such that the engine stop can be detected, and when the engine stop is detected, following the engine stop, or after a predetermined delay processing, which makes the shutdown section shut down the feeding path; and an annunciation control section to output the third annunciation output through the annunciation section, corresponding to the detection of the engine stop by the engine stop detecting section, are provided.

Further, the technical means for attaining the object is as follows.

An automobile power source monitor by which a power supply condition when the electric power from a battery is supplied to electric devices through a feed socket provided in a car, is monitored, the automobile power source monitor is characterized in that: on a feeding path between the battery and the feed socket, a shutdown section provided so as to shut down the feeding path; a current detecting section to detect the current value flowing to the electric devices through the feed socket; a voltage detecting section to detect the output voltage of the battery; an annunciation section by which at least any one of a sound or a light can be outputted; the first shutdown control section which judges whether the current value detected by the current detecting section is the over current, and when it is judged to be the over current, which makes the shutdown section shut down the feeding path; the second shutdown control section which judges whether the voltage value detected by the voltage detecting section is lowered lower than a predetermined reference level, and which makes the shutdown section shut down the feeding path when it is judged to be lower; an idling-up instruction section to judge whether the current value detected by the current detecting section is over than a predetermined idling-up reference, and to output the idling-up instruction to an engine control unit when it is judged to be over; an engine stop detecting section which is provided such that the engine stop can be detected, and when the engine stop is detected, following the engine stop, or after a predetermined delay processing, which makes the shutdown section shut down the feeding path; and an annunciation control section to output the first annunciation output through the annunciation section, corresponding to the shutdown of the shutdown section by the first and second shutdown control sections, to output the second annunciation output through the annunciation section, corresponding to the output of the idling-up instruction by the idling-up instruction section, and to output the third annunciation output through the annunciation section, corresponding to the detection of the engine stop by the engine stop detecting section, are provided.

Further, preferably, the engine stop detecting section, following the detection of the engine stop, integrates the current value detected by the current detecting section as the time passage, and as the integrated value exceeds a predetermined reference value, makes the shutdown section shut down the feeding path; and the annunciation section is further provided with the function to output the first annunciation output through the annunciation section, corresponding to the shutdown of the shutdown section by the engine stop detecting section.

DETAILED DESCRIPTION OF THE PREFERRED EMBODIMENTS (1. First Embodiment)

Figure 1:
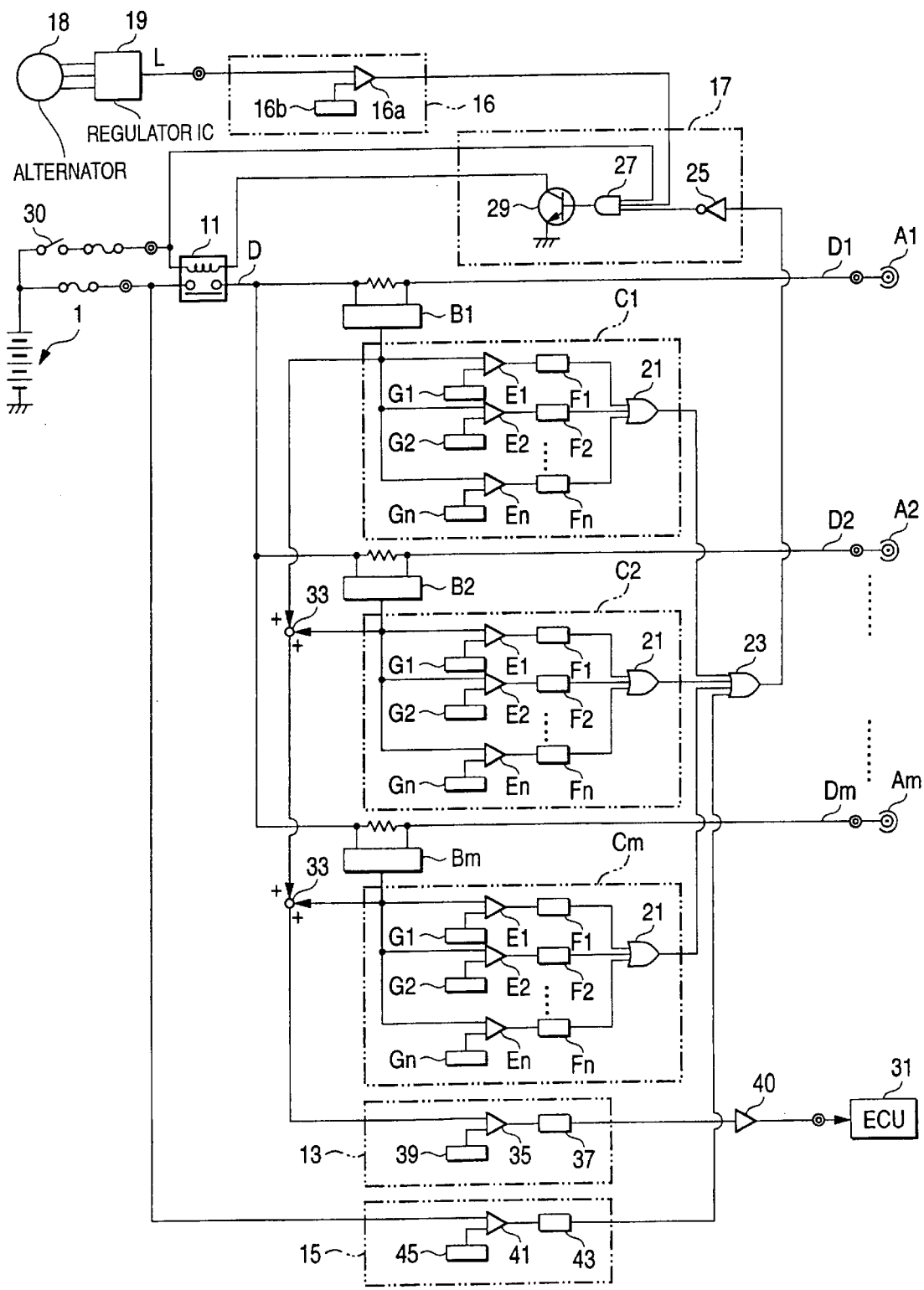
FIG. 1 is a block diagram of an automobile power source monitor according to the first embodiment of the present invention.

FIG. 1 is a block diagram of an automobile power source monitor according to the first embodiment of the present invention. This automobile power source monitor is used for monitoring a supply condition of the electric power supplied to electric devices from a plurality of feed sockets A1–Am such as a cigar lighter socket, or accessory socket, connected to a battery 1, and is structured being provided with: a breaker (shutdown section) 11; a plurality of current detecting circuits B1–Bm and over current detecting circuits C1–Cm, provided for each of feed sockets A1–Am; an idling-up instruction circuit 13; a low voltage detecting circuit 15; an engine stop detecting circuit (engine stop detecting section)16; and a driving circuit 17 for driving the beaker 11. A plurality of feed sockets A1–Am are provided in the car room, and connection plugs for electric power receiving of each kind of electric devices are detachably connected.

The breaker 11 is a relay provided on a feeding path D from the battery 1 to each of feed sockets A1–Am, and by the control of the driving circuit 17, the feeding path D is made to pass or shut down the current. Incidentally, herein, the relay is used for the breaker 11, however, a switching element such as a transistor (for example, FET (Field Effect Transistor))may be used. The feeding path D is branched into a plurality of branched paths D1–Dm on the downstream side of the beaker 11, and these branched paths are connected to each of feed sockets A1–Am.

The engine stop detecting circuit 16 is used for detecting the stop of the engine according to an output signal (L signal) outputted from a regulator IC 19 during the power generation of an alternator 18, and for shutting down the breaker 11 through the driving circuit 17 at the time of engine stop.

In more detail, herein, the L signal outputted from the regulator IC 19 is High level when the engine is operated and the power generation of the alternator 18 is conducted, and is switched to Low level as the engine is stopped and the power generation of the alternator 18 is stopped.

Corresponding to this, in the present embodiment, the engine stop detecting circuit 16 is provided with a comparator 15a, and by detecting a signal level of the L signal by the comparator 16a, the stop of the engine is detected.

In the comparator 16a, a predetermined reference level 16b is set, and the comparator 16a compares the signal level of the inputted L signal with the reference level 16b, and when the signal level of the L signal is High level and is higher than the reference level 16b, the High level signal is outputted to an AND gate 27 of the driving circuit 17, which will be described later, and on the one hand, when the signal level of the L signal is Low level and lower than the reference level 16b, the output signal to the AND gate 27 is switched from High level to the Low level so that the shutdown section 11 is made to shut down corresponding to that. Incidentally, the output signal of the comparator 16a, switched to the Low level, is switched to the High level as the operation of the engine is started again.

Each of current detecting circuits B1–Bm detects the value of the current flowing to each of feed sockets A1–Am through each of branched paths D1–Dm, and outputs a signal showing the detection value.

Each of over current detecting circuits C1–Cm is used for detecting the over current according to the detection value of each of current detecting circuits, and for operating the breaker 11 through the driving circuit 17, and is provided with a plurality of comparators E1–En which form a pair with each other, and filter circuits (timer circuits) F1–Fn, and an OR gate 21.

Each of comparators E1–En is used for judging the over current from the magnitude of the current, and the reference levels G1–Gn showing the reference current values different from each other, which are criterions of the over current, are respectively set. Then, each of comparators E1–En compares the signal level of the signal outputted from the corresponding current detecting circuit with the set reference levels G1–Gn, and when the input signal level is not larger than the reference levels G1–Gn, the signal of the Low level is outputted, and on the one hand, when it is not smaller than the reference levels G1–Gn, the signal of the High level is outputted.

Each of filter circuits F1 is provided for judging the over current from an aspect of the flowing time of the current, and the setting times corresponding to the reference current values set in corresponding comparators E1–En are set. Then, each of filter circuits F1–Fn normally outputs the Low level signal, and only when the High level signal is inputted continuously for a time more than setting time set from the corresponding comparators E1–En, the High level signal is outputted.

An output condition of the High level signal of filter circuits F1–Fn is held, for example, for a period in which an accessory switch 30 is turned ON, and when the accessory switch 30 is tuned OFF, it is reset to an initial condition.

In the OR gate 21, when the High level signal is inputted from at least one of filter circuits F1–Fn in corresponding plural filter circuits F1–Fn, the output signal is switched from the Low level to the High level corresponding to that. Then, when the High level signal is outputted from the OR gate 21, the breaker 11 is shut down, as will be described later.

Figure 2:
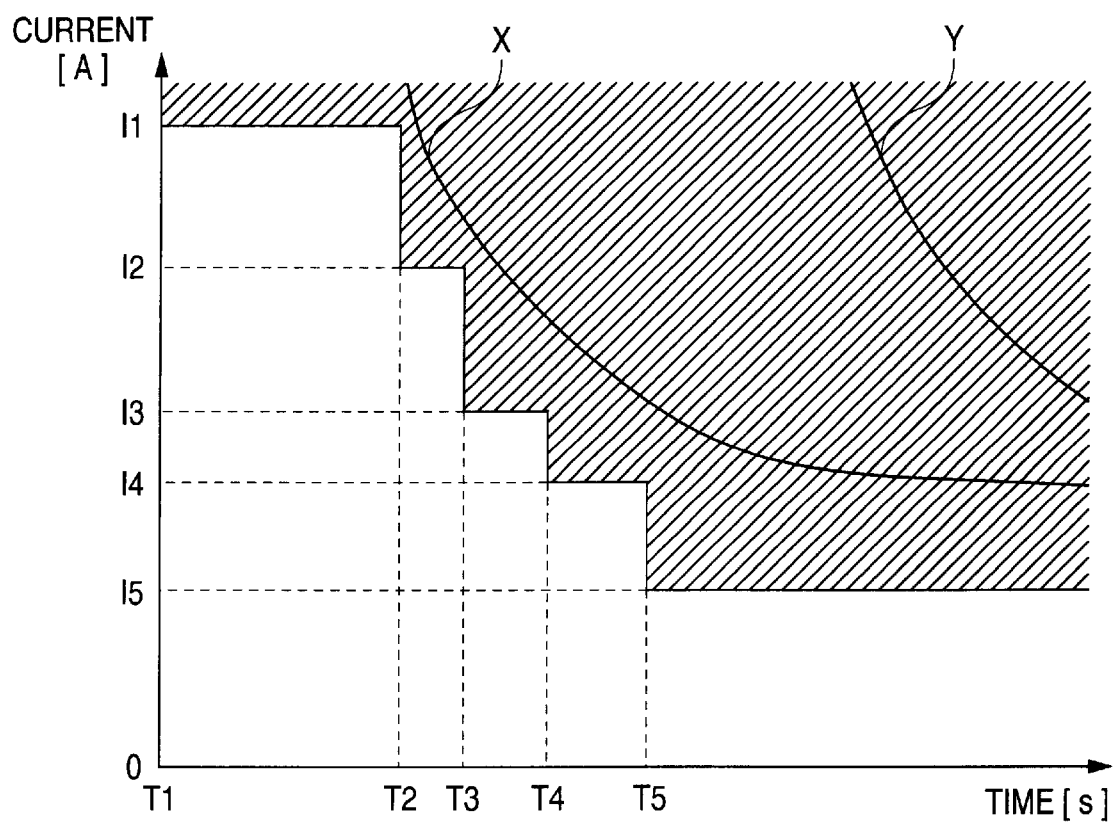
FIG. 2 is a view showing a plurality of reference current values for the judgement of the over current and setting times, set in the power source monitor in FIG. 1.

Herein, according to the following Table 1 and FIG. 2, an example of setting of a plurality of reference current values and setting times, is shown. In this example, in each of comparators E1–En and each of filter circuits F1–Fn of each of over current detecting circuits C1–Cm, as shown in Table 1, 5 sets of reference current values I1–I5, and setting times T1–T5 are set.

TABLE 1

|  | Condition | | | | |
| --- | --- | --- | --- | --- | --- |
|  | I | II | III | IV | V |
| Reference current value [A] | I1 | I2 | I3 | I4 | I5 |
| Allowable time [s] | T1 | T2 | T3 | T4 | T5 |

In FIG. 2, a hatched area shows an area in which the current is judged to be over current under this setting example, by the over current detecting circuits C1–Cm, and a graph X is a graph showing the fusing characteristic of a fuse with 15 A capacity, and a graph Y showing the smoke characteristic of a copper wire with the 0.85 mm diameter. That is, in the present embodiment, 5 sets of reference current values I1–I5 and setting times T1–T5 as shown in FIG. 2, are set in such a manner that these simulate the fusing characteristic of the fuse with 15 A capacity. Herein, the setting time T1 corresponding to the reference current value I1 is set to 0, and when the current value flowing from each of feed sockets A1–Am is not smaller than the reference current value I1, the breaker 11 is shut down at once.

Incidentally, herein, 5 sets of reference current values I1–I5, and setting times T1–T5 are set in such a manner that these simulate the fusing characteristic of the fuse with 15 A capacity, however, it may also be allowable to be set so that these simulate the smoke characteristic of the copper wire of 0.85 mm diameter.

The idling-up instruction circuit 13 is a circuit to detect an increase of the supply current according to the total sum of the current flowing through each of feed sockets a1–Am, and to output an idling-up instruction of a predetermined level to the engine control unit 31, and is composed of addition circuit 33, comparator 35 and filter circuit 37.

The addition circuit 33 receives signals outputted from each of current detecting circuits B1–Bm, and adds the current values detected by each of current detecting circuits B1–Bm, and outputs the signal corresponding to the value after its addition.

Comparator 35 is a component to judge the necessity and not of the idling-up from an aspect of the magnitude of the current, and the reference level 39 showing the reference current value as the criterion is set therein. Then, the comparator 35 compares the signal level of the signal outputted from the addition circuit 33 with the reference level 39 set therein, and when the input signal level is not larger than the reference level 39, the comparator 35 outputs the signal of Low level, and on the one hand, when it is not smaller than the reference level 39, the comparator 35 outputs the signal of High level.

The filter circuit 37 judges the necessity or not of the idling-up from the flowing time of the current, and the setting time corresponding to the reference current value set in the comparator 35 is set therein. Then, the filter circuit 37, normally, outputs the signal of Low level, and only when the signal of High level is continuously inputted for a time more than a setting time set from the corresponding comparator 35, the signal of High level (idling-up instruction) is outputted. The output condition of the High level signal of the filter circuit 37 is held, for example, for a period in which the accessory switch 30 is turned ON, and when the accessory switch 30 is turned OFF, it is reset to the initial condition.

That is, in the present embodiment, the idling-up reference is determined by the reference current value set in the comparator 35 and the setting time set in the filter circuit 37.

The output signal from the filter circuit 37 is inputted into the engine control unit 31 through an amplifier 40, and when the signal of High level is outputted from the filter circuit 37, the engine control unit conducts the idling-up of a predetermined level according to that, and as the result, the power generation amount of the alternator is increased by the predetermined level of amount.

The low voltage detecting circuit 15 is a circuit to detect the lowering of the battery voltage and shut down the breaker 11, and is provided with the comparator 41 and the filter circuit 43. The comparator 41 is connected to the feeding path D on the upstream side of the breaker 11, and successively detects the output voltage of the battery through the connection point to the feeding path D, and compares the detected output voltage with the reference voltage value shown by the reference level 45 set therein, and when the output voltage is not larger than the reference voltage, the signal of Low level is outputted, and on the one hand, when it is not smaller than the reference voltage, the signal of High level is outputted.

A predetermine setting time is set in the filter circuit 43. The filter circuit 43, normally, outputs the signal of Low level, and only when the signal of High level is continuously inputted for a time more than a setting time set from the comparator 41, the signal of High level is outputted so that the breaker 11 is shut down. The output condition of the High level signal of the filter circuit 43 is held, for example, for a period in which the accessory switch 30 is turned ON, and when the accessory switch 30 is turned OFF, it is reset to the initial condition.

The driving circuit 17 is a circuit to drive and control the breaker 11 according to the output signal of the comparator 15a of the engine stop detecting circuit 16, the output signal of the OR gate 21 of each of the over current detecting circuits C1–Cm, the output signal of the filter circuit 43 of the low voltage detecting circuit 15, and the accessory power source signal which will be described later, and is provided with an OR gate 23, inverter 25, AND gate 27, and transistor 29.

The current flowing, and shutdown conditions of the breaker 11 are switched depending on ON and OFF of the transistor 29, and the transistor 29 is turned ON and OFF by the output signal of the AND gate 27.

On the one hand, the output signal from each of over current detecting circuits C1–Cm and the low voltage detecting circuit 15, is inputted into the OR gate 23, and the output signal from the OR gate 23 is inputted into the first input terminal of the AND gate 27 through the inverter 25. Further, the output signal of the comparator 16a of the engine stop detecting circuit 16 and the signal (accessory power source signal) switched between the High and Low according to ON and OFF of the accessory switch 30, are inputted into the second and the third input terminals of the AND gate 27.

The AND gate 27 makes the output signal to the transistor 29 High level, only when all of these 3 signals inputted into the first to the third input terminals are High level, and in the other case, the output signal to the transistor 29 is made Low level. Thereby, the breaker 11 is driven and controlled by these 3 signals inputted into the AND gate 27.

Next, the operation of this power source monitor will be described. When the ignition switch is switched from the OFF mode to the accessory mode to turn ON the accessory switch 30, and is further switched to the start mode to start the engine, and the engine is started, and it is set to the ON mode to continue the drive of the engine, then, according to this, the High level accessory power source signal is inputted into the third input terminal of the AND gate 27 of the driving circuit 17, and the High level output signal from the engine stop detecting circuit 16 is inputted into the second input terminal of the AND gate 27.

At this time, at the time of normal case where there is no over current and no lowering of the output voltage of the battery 1, all of the output signals of each of the over current detecting circuits C1–Cm, and the low voltage detecting circuit 15 are in Low level, and the signal inputted into the first input terminal of the AND gate 27 from the OR gate 23 through the inverter 25, is in High level.

As the result, the transistor 29 is turned ON, thereby, the circuit from the positive terminal of the battery 1 to the ground through an accessory switch 30, an electromagnetic coil of the breaker 11, and transistor 29, has the continuity, and the electromagnetic coil of the breaker 11 is electrically excited and the contact of the breaker 11 is turned ON, and the feeding path D has the continuity, thereby, each of feed sockets A1–Am is on a usable condition.

Then, on this condition, when the ignition switch is switched from the ON mode to the accessory mode, or the engine is stopped by an en-st, and the L signal outputted from the regulator IC 19 is switched from the High level to the Low level, according to this, the output signal from the comparator 16a of the engine stop detecting circuit 16 is switched from the High level to the Low level, thereby, the output signal of the AND gate 27 is switched from the High level to the Low level, and the transistor 29 is turned OFF, the breaker 11 is turned OFF, and the feeding path D is shut down, and until the engine is operated again, each of feed sockets A1–Am can not be used.

The shutdown condition of each of feed sockets A1–Am by the engine stop is removed when the engine is started again and the output signal of the engine stop detecting circuit 16 is switched from the Low level to the High level.

Further, when the value of the current flowing through any one of feed sockets A1–Am is larger than the reference current value set in any one of comparators E1–En of the over current detecting circuits C1–Cm corresponding to the feed sockets A1–Am, and the condition that it is over the reference current value, is continued for the time more than setting time set in the filter circuits F1–Fn corresponding to any one of comparators E1–En, the output signal of the filter circuits F1–Fn is switched from the Low level to the High level, and according to this, the output signal from the OR gate 21 of the over current detecting circuits C1–Cm corresponding to the feed sockets A1–Am is switched from the Low level to the High level, and the output signal of the OR gate 23 is switched from the Low level to the High level. As the result, the output signal of the AND gate 27 is switched from the High level to the Low level, the transistor 29 is turned OFF, and the breaker 11 is turned OFF, the feeding path D is shut down, and the consumption of the battery 1 by the over current is prevented.

Further, when the output voltage of the battery 1 becomes a condition lower than the reference voltage value set in the comparator 41 of the low voltage detecting circuit 15, and this condition continues for a time longer than the setting time set in the filter circuit 43, the output signal from the filter circuit 43 is switched from the Low level to the High level, and according to this, the output signal of the OR gate 23 is switched from Low level to the High level, thereby, the output signal of the AND gate 27 is switched from the High level to the Low level, the transistor 29 is turned OFF, the breaker 11 is turned OFF, and the feeding path D is shut down, and the excessive lowering of the output voltage of the battery 1 is prevented.

Herein, when the High level output signal is outputted from the filter circuits F1–Fn, and 43, because the output condition of this High level is held until the accessory switch 30 is turned OFF, the output signal of the OR gate 23 is also held in the High level status until the accessory switch 30 is turned OFF. Further, when the accessory switch 30 is turned OFF, the engine is also inevitably stopped. Accordingly, when the breaker 11 is turned OFF by the over current or the lowering of the output voltage of the battery 1, until the user switches once the ignition switch from the ON mode to the OFF mode in which the accessory switch 30 is turned OFF, and is switched again to the start mode to start the engine and the ON mode, and the engine is started again, the breaker 11 is held in the condition that it remains OFF.

Further, even when the current is not judged to be over current in each of over current detecting circuits C1–Cm, when the total sum of the current flowing from each of feed sockets A1–Am is larger than the reference current value set in the comparator 35 of the idling-up instruction circuit 13, and this condition continues for the time more than setting time set in the filter circuit 37, the output signal from the filter circuit 37 is switched from the Low level to the High level. According to this, the predetermined level of the idling-up is conducted by the engine control unit 31, and the power generation amount of the alternator is increased.

As described above, according to the present embodiment, when the engine is stopped, because the breaker 11 is turned OFF through the driving circuit 17 by the engine stop detecting circuit 16, and the feeding path D from the battery 1 to each of feed sockets A1–Am is shut down, the feed sockets A1–Am can not be used during the engine stop, and the consumption of the battery 1 when the engine is stopped, can be assuredly prevented.

Further, because the stop of the engine is detected according to the L signal outputted by the regulator IC, for example, even when the engine is stopped by the en-st in the condition that the ignition switch is the ON mode, the stop condition of the engine can be assuredly detected, and as the result, the consumption of the battery 1 when the engine is stopped, can be securely prevented.

Further, because the range judged to be the over current is determined by a plurality of reference current values and a plurality of setting times individually corresponding to each of the reference current values, as shown in the hatched range in FIG. 2, the battery 1 can be effectively protected from the wide range of over current, form the over current having the relatively small current value to the over current having the large current value, and when it is a short time, the supply of the large current such as the rush current of the motor can be allowed in the permissible range of the battery 1, and in the range in which there is no problem for the protection of the battery 1, it can be prevented that the use of the electric devices is hindered.

Further, when the condition that the total sum of the current flowing from each of feed sockets A1–Am is larger than a predetermined reference current value, is continued for a time more than a predetermined setting time, because the idling-up is conducted, and the power generation amount of the alternator is increased, the consumption of the battery 1 by the increase of the current flowing from the feed sockets A–Am can be previously prevented.

Further, when the condition that the output voltage of the battery 1 is smaller than a predetermined reference voltage value, is continued for a time more than a predetermined setting time, because the feeding path D is shut down, the excessive consumption of the battery 1 can be prevented.

Incidentally, in the present embodiment, one set of each of the current detecting circuits B1–Bm and each of the over current detecting circuits C1–Cm is provided for each of feed sockets A1–Am, however, one set of each of the current detecting circuits B1–Bm and each of the over current detecting circuits C1–Cm may be provided for each of a predetermined number of feed sockets A1–Am.

(2. Second Embodiment)

Figure 3:
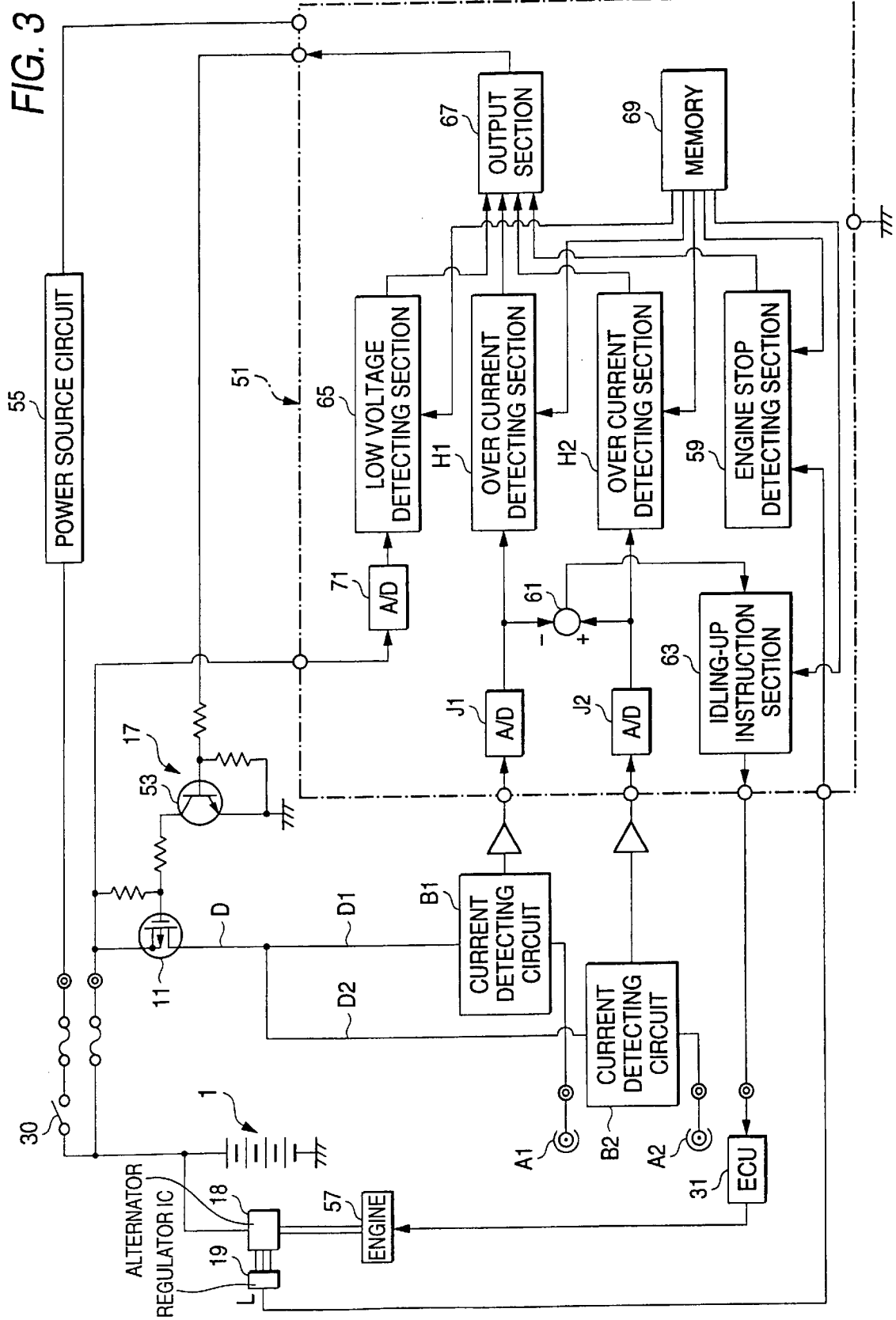
FIG. 3 is a block diagram of an automobile power source monitor according to the second embodiment of the present invention.

FIG. 3 is a block diagram of the automobile power source monitor according to the second embodiment of the present invention. The power source monitor according to the present embodiment is characterized in that the function of the engine stop detecting circuit 16, over current detecting circuits C1–Cm, idling-up instruction circuit 13, and low voltage detecting circuit 15 according to the first embodiment, is included in a microcomputer 51, and the other portion is practically the same.

Incidentally, herein, a case where 2 feed sockets A1 and A2 are provided, will be described. Further, in the present embodiment, as the breaker 11, a field effect transistor (FET)

is used, but, a relay switch may be used. The breaker 11 is driven by a driving circuit 17 including a transistor 53. To the microcomputer 51, the power source is supplied by a power circuit 55 connected to the battery 1 through the accessory switch 30. Further, in FIG. 3, the engine is shown by a numeral 57.

The microcomputer 51 is, mainly, provided with: an engine stop detecting section 59 provided corresponding to the engine stop detecting circuit 16; a plurality of (herein, two) over current detecting sections H1 and H2 provided corresponding to each of current detecting circuits B1 and B2; an adding section 61; an idling-up instruction section 63; a low voltage detecting section 65; an output section 67; and a memory 69.

In the engine stop detecting section 59, in the same manner as in the first embodiment, the L signal outputted from the regulator IC 19 is inputted, and the engine stop detecting section 59 detects the stop of the engine 57 according to the inputted L signal. In more detail, by detecting the switching of the inputted L signal form the High level to the Low level, the stop of the engine 57 is detected.

Then, when the engine stop detecting section 59 detects the stop of the engine 57, it outputs an instruction (shut down instruction) to make the FET 11 turn OFF to the output section 67 according to that, thereby, the FET 11 is made to be turned OFF through the output section 67 and driving circuit 17, and the feeding path D is shut down. Further, when the engine stop detecting section 59 detects the restart or start of the operation of the engine 57 according to the L signal, the outputted shutdown instruction is removed.

In the memory 69, a plurality of the first reference current values which are criterions of the over current, and a plurality of the first setting times corresponding to the each of the first reference current values, are correspond to 1 to 1, and are previously stored. Further, in the memory 69, the second reference current value which is the criterion of the necessity or not of the idling-up, and the second setting time corresponding to the second reference current value, are previously stored, and the reference voltage value which is the criterion of the occurrence or not of the lowering of the output voltage of the battery 1, and the third setting value corresponding to the reference voltage value, are previously stored. The point to set these first and second reference current values, reference voltage value and the first to third setting times, is the same as in the first embodiment.

Each of over current detecting sections H1 and H2 successively recognizes the current value flowing through each of feed sockets A1 and A2, according to the signals inputted through the A/D converters J1 and J2 from each of current detecting circuits B1 and B2 corresponding to the over current detecting sections H1 and H2, and compare the current value to each of the first reference current values stored in the memory 69, and when the current value is larger than any one of the first reference current values, the count operation of the passing time is started.

Then, while each of over current detecting sections H1 and H2 conducts the count operation of the passing time, each of over current detecting sections H1 and H2 successively judges whether the counted passing time is more than the first setting time, stored in the memory 69, corresponding to any one of the first reference current value, and when the counted passing time is more than the corresponding first setting time, each of over current detecting sections H1 and H2 gives the instruction (shutdown instruction) to turn OFF the FET 11 to an output section 67, which will be described later, and on the one hand, when the current value is not larger than any one of the first reference current values, before the passing time is more than the corresponding first setting time, the count operation is stopped and the count value is reset.

When the shutdown instruction is outputted once from each of over current detecting sections H1 and H2, the shutdown instruction is held until the accessory switch 30 is turned OFF, and when the accessory switch 30 is turned OFF, the instruction is removed according to that.

The addition section 61 adds the current value flowing through each of feed sockets A1 and A2, according to the signals inputted through the A/D converters J1 and J2 from each of current detecting circuits B1 and B2, and gives it to the idling-up instruction section 63.

The idling-up instruction section 63 successively recognizes the total sum of the total current value flowing via feed sockets A1 and A2 through the addition section 61, and compares the total current value to the second reference current value stored in the memory 69, and when the total current value is larger than the second reference current value, the count operation of the passing time is started.

Then, while the idling-up instruction section 63 conducts the count operation of the passing time, the idling-up instruction section 63 successively judges whether the counted passing time is more than the second setting time, stored in the memory 69, and when the counted passing time is more than the second setting time, the idling-up instruction to instruct the predetermined level of the idling-up is outputted to the engine control unit 31, and on the one hand, when the total current value is not larger than the second reference current value, before the passing time is more than the second setting time, the count operation is stopped and the count value is reset.

The low voltage detecting section 65 successively recognizes the output voltage value of the battery 1, according to the signal given from the A/D converter 71 connected to the upstream side of the FET 11 of the feeding path, and compares the output voltage value to the reference voltage value stored in the memory 69, and when the output voltage value is larger than the reference voltage value, the count operation of the passing time is started.

Then, while the low voltage detecting section 65 conducts the count operation of the passing time, it successively judges whether the counted passing time is more than the third setting time stored in the memory 69, and when the counted passing time is more than the third setting time, the low voltage detecting section 65 gives the instruction (shutdown instruction) to turn OFF the FET 11 to an output section 67, which will be described later, and on the one hand, when the output voltage value is not larger than the reference voltage values, before the passing time is more than the third setting time, the count operation is stopped and the count value is reset.

When the shutdown instruction is outputted once from the low voltage detecting section 65, the shutdown instruction is held until the accessory switch 30 is turned OFF, and when the accessory switch 30 is turned OFF, according to that, the shutdown instruction is removed.

In the condition in which the accessory switch 30 is turned ON, and the shutdown instruction is not outputted from any one of the engine stop detecting section 59, each of the over current detecting section H1 and H2, and the low voltage detecting section 65, (that is, the condition in which the engine 57 is operated, and there is no over current and no voltage lowering of the battery 1), the output section 67 outputs the High level signal so as to turn ON the FET 11. Then, when the accessory switch 30 is turned OFF, or the shutdown signal is inputted from at least one of the engine stop detecting section 59, each of the over current detecting sections H1, H2, and the low voltage detecting section 65, the output section 67 switches the output signal from the High level to the Low level, corresponds to this.

The output signal of the output section 67 is inputted into the transistor 53 of the driving circuit 17, and when the output signal of the output section 67 is switched between the High level and the Low level, being interlocked with ON or OFF of the transistor 53 according to this, the FET 11 is turned ON or OFF, thereby, the feeding path D has the continuity or is shut down.

Next, the operation of this power source monitor will be described. When the ignition switch is switched from the OFF mode to the accessory mode to turn ON the accessory switch 30, and is further switched to the start mode to start the engine and the engine is started, and the ignition switch is set to ON mode to continue the drive of the engine 57, according to this, the shutdown instruction outputted from the engine stop detecting section 59 of the control section 51 is removed.

At this time, in the normal case in which there is no over current and no lowering of the output voltage of the battery 31, because the shutdown instruction is not outputted from each of over current detecting sections H1, H2, and the low voltage detecting section 65, according to the start of the engine 57, the output signal of the output circuit 67 is switched from the Low level to the High level, and the transistor 53 of the driving circuit 17 is turned ON, thereby, the FET is turned ON, and each of feed sockets A1–Am becomes a usable condition.

Then, in this condition, when the ignition switch is switched from ON mode to the accessory mode, or the engine is stopped by the en-st, and the L signal outputted from the regulator IC 19 is switched from the High level to the Low level, according to this, the shutdown instruction is outputted from the engine stop detecting section 59, and the output signal of the output section 67 is switched from the High level to the Low level, thereby, the transistor 53 is turned OFF, and the FET 11 is turned OFF, and the feeding path is shut down, and until the engine is operated again, each of the feed sockets A1–Am becomes unusable.

This shutdown condition of each of the feed sockets A1 and A2 by the stop of the engine 57 is removed as the engine is restarted and the shutdown instruction from the engine stop detecting section 59 is removed.

Further, when the value of the current flowing through any one of the fed sockets A1 and A2 is larger than any one of the first reference current values stored in the memory 69, and this larger condition continues for a time more than the first setting time corresponding to the first reference current values stored in the memory 69, the shutdown instruction is outputted from the over current detecting sections H1 and H2 corresponding to the feed sockets A1 and A2, and the output signal of the output section 67 is switched from the High level to the Low level, thereby, the transistor 53 is turned OFF, the FET 11 is turned OFF and the feeding path D is shut down, and the consumption of the battery 1 by the over current is prevented.

Further, when the output voltage of the battery 1 is not larger than the reference voltage value stored in the memory 69, and that condition continues for a time more than the third setting time stored in the memory 69, the shutdown instruction is outputted from the low voltage detecting section 65, and the output signal of the output section 67 is switched from the High level to the Low level, thereby, the transistor 53 is turned OFF, and the FET 11 is turned OFF and the feeding path D is shut down, and the excessive lowering of the output voltage of the battery 1 is prevented.

In this manner, the return of the FET 11 in the case where the FET 11 is turned OFF by the over current or the output lowering of the battery 1, is conducted, after the ignition switch is switched from the ON mode to the oFF mode and the accessory switch 30 is turned OFF, and the shutdown instruction outputted from the over current detecting sections H1 and H2 is removed, when the ignition switch is switched to the start mode and the ON mode, and the accessory switch 30 is tuned ON and the engine 57 is restarted.

Further, even when the current is not judged to be over current in each of over current detecting sections H1 and H2, when the total sum of the current flowing from each of feed sockets A1–Am is larger than the second reference current value stored in the memory 69, and that condition continues for the time more than second setting time stored in the memory 69, the idling-up instruction is outputted from the low voltage detecting section 65, and according to this, a predetermined level of the idling-up is conducted by the engine control unit 31, and the power generation amount of the alternator is increased.

As described above, according also to the present embodiment, the same effect as in the first embodiment in which the consumption of the battery 1 at the time of the stop of the engine 57 can be securely prevented, is obtained.

Incidentally, in the present embodiment, when the engine 57 is stopped, the engine stop detecting section 59 turns OFF at once the FET 11 through the output section 67 and driving circuit 17, however, it may also be allowed that the FET is turned OFF after a predetermined time is passed after the engine is stopped. This is attained when the engine stop detecting section 59 has the timer function to conduct the count operation for the predetermined time period when the stop of the engine 57 is detected, and after the engine 57 is topped, the shutdown instruction is outputted after the count operation of the predetermined time is completed. Incidentally, during the count operation of the predetermined time, when the engine is started again, the count operation is cancelled, and the shutdown instruction is not outputted.

According to such the structure, while a predetermined time passes after the engine is stopped, because the feed sockets A1 and A2 can be used, a case in which the power feeding from the feed sockets A1 and A2 is suddenly stopped accompanied by the stop of the engine 57, does not occur, which is convenient.

Further, in the present embodiment, the stop of the engine 57 is detected according to the L signal of the regulator IC 19, however, the stop of the engine 57 may also be detected when the engine stop detecting section 59 detects the switching from the On mode of the ignition switch to other modes (accessory mode or OFF mode) indicating the stop of the engine 57.

(3. Third Embodiment)

Figure 4:
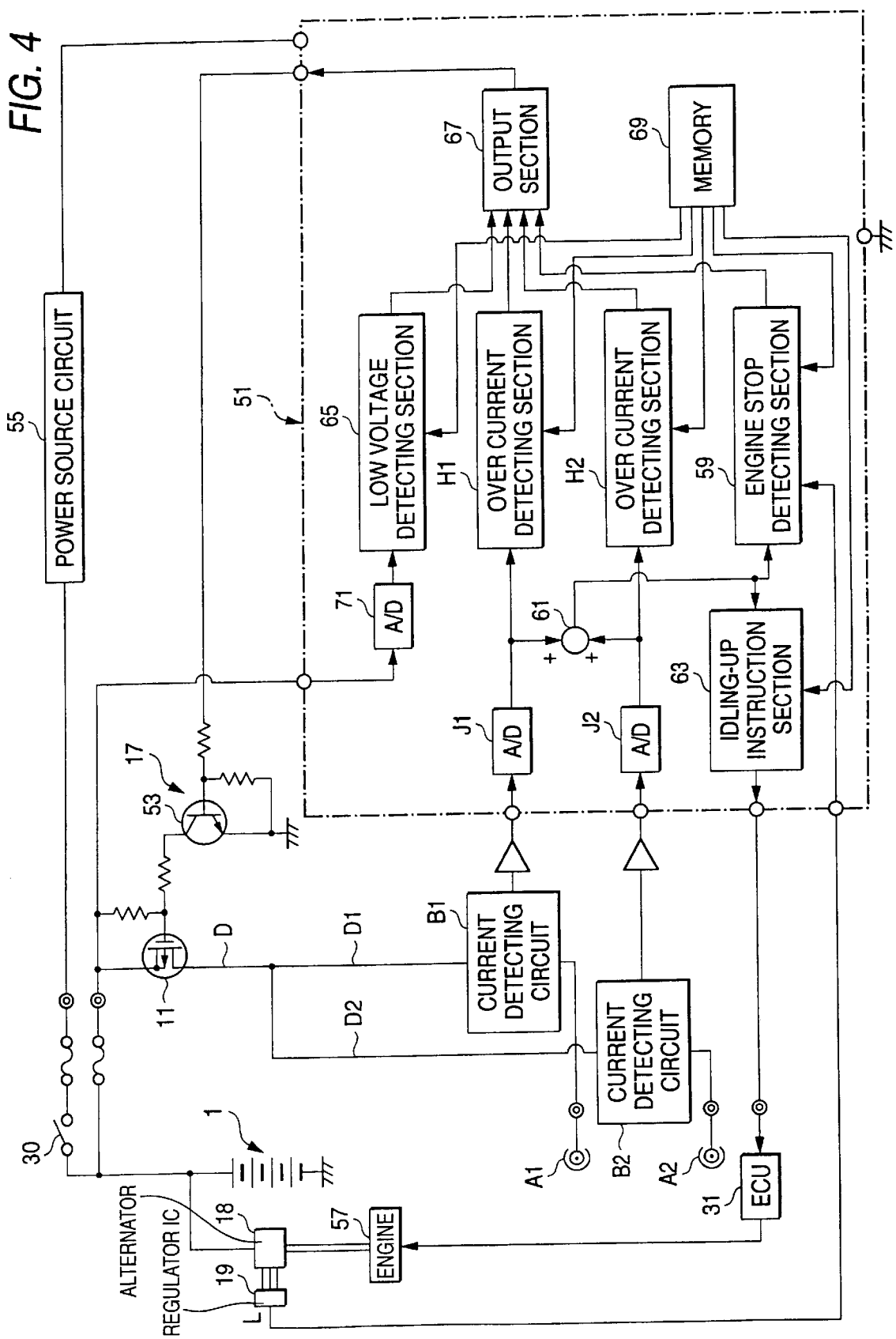
FIG. 4 is a block diagram of an automobile power source monitor according to the third embodiment of the present invention.

FIG. 4 is a block diagram of an automobile power source monitor according to the third embodiment of the present invention. The different point of the automobile power source monitor according to the present embodiment from the automobile power source monitor according to the second embodiment, is that, when the integrating value of the feeding current value from each of feed sockets A1 and A2 is larger than the predetermined reference value after the engine 57 is stopped, the engine stop detecting section 59 detects that, and turns OFF the FET 11, and according to this, the calculation value of the adding section 61 is inputted into the engine stop detecting section 59. Incidentally, relating to the other structure, it is the same as the second embodiment.

In the present embodiment, when the engine stop detecting section 59 detects the stop of the engine 57 according to the L signal, according to this, the total sum of the feeding current value from each of feed sockets A1 and A2 shown by the signal inputted from the adding section 61 is integrated, and when the integrating value is larger than a predetermined reference value previously set in the memory 69, the shutdown instruction is outputted to turn OFF the FET 11. Incidentally, when the engine 57 is started again before the integrating value reaches the predetermined reference value, the integrating operation of the feeding current value is cancelled, and the FET 11 is not turned OFF.

Accordingly, even when the engine 57 is stopped, the FET 11 is not turned OFF at once, and when the integrating value of the feeding power value fed from the each of feed sockets A1 and A2 exceeds a predetermined reference value, the FET 11 is shut down.

As described above, according to the present embodiment, even when the engine 57 is stopped, because the feed sockets A1 and A2 can be used until the integrating value of the feeding current values from the feed sockets A1 and A2 reaches the predetermined value, the facility can be increased while the consumption of the battery 1 is being prevented.

(4. Fourth Embodiment)

Figure 5:
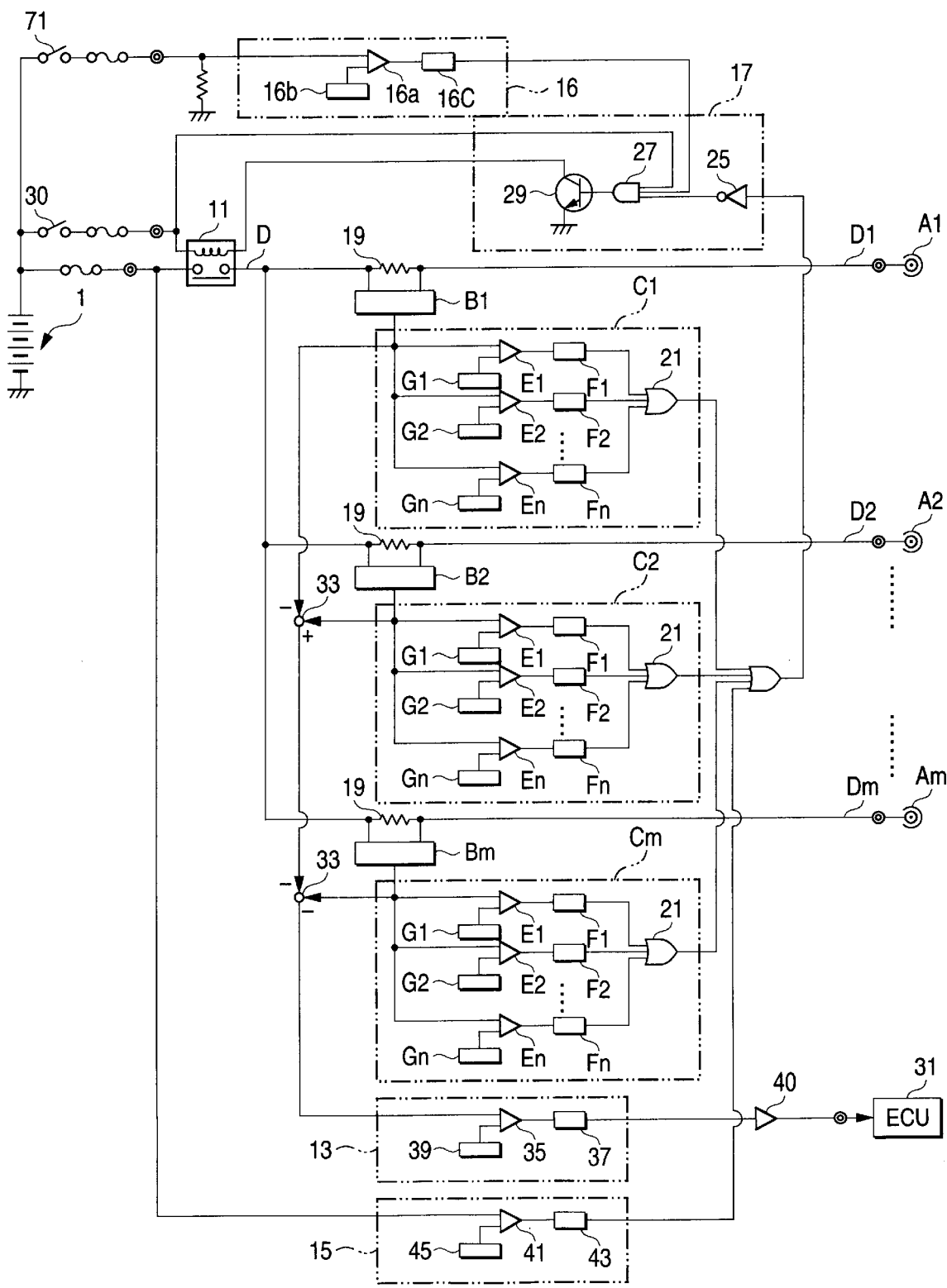
FIG. 5 is a block diagram of an automobile power source monitor according to the fourth embodiment of the present invention.

FIG. 5 is a block diagram of an automobile power source monitor according to the fourth embodiment of the present invention. The different point of the automobile power source monitor according to the present embodiment from the automobile power source monitor according to the first embodiment, is that, when the engine stop detecting circuit 16 detects, not the L signal of the regulator IC 19, but the switching from ON to OFF of the ignition switch 71, that is, the switching from the ON mode of the ignition switch 71 to other modes indicating the stop of the engine (accessory mode or OFF mode), the stop of the engine is detected, and that the timer circuit 16c is provided on the back stage of the comparator 16a of the engine stop detecting circuit 16, and the other portion is the same structure.

In the present embodiment, the stop of the engine is detected when the ignition switch signal switched from the High level to the Low level when the ignition switch 71 is switched from ON to OFF, is inputted into the comparator 16a of the engine stop detecting circuit 16, and when the switching of the ignition switch signal from the High level to the Low level is detected by the comparator 16a, the stop of the engine is detected.

That is, the comparator 16a compares the inputted signal level of the ignition switch signal to the reference level 16b, and when the signal level of the ignition switch signal is the High level, and exceeds the reference level 16b, it outputs the output signal of the High level, and the ignition switch signal is switched from the High level to the Low level, and according to its switching, when the ignition switch signal is lower than the reference level 16b, the output signal is switched from the High level to the Low level.

The timer circuit 16c outputs the output signal of the High level to the second input terminal of the AND gate 27 of the driving circuit 17 when the output signal of the High level is outputted from the comparator 16a, and on the one hand, when the output signal of the comparator 16a is switched from the High level to the Low level, corresponding to this, the timer circuit 16a starts the measuring operation for a predetermined time, and when the measuring operation for a predetermined time is completed, its output signal is switched from the High level to the Low level.

Incidentally, when the output signal of the comparator 16a is switched from the Low level to the High level during the measuring operation for the predetermined time, the timer circuit 16c cancels the measuring operation, and holds the output signal to the AND gate 27 on the High level. Further, in the case where the output signal of the comparator 16a is switched from the Low level to the High level when the timer circuit 16c outputs the output signal of the Low level, the timer circuit 16c switches the output signal from the Low level to the High level at once.

According to such the structure, accompanied by the switching of the ignition switch 71 from the ON mode to the accessory mode or OFF mode, when the output signal of the comparator 16a is switched from the High level to the Low level, the timing of the switching is delayed by the timer circuit 16c by a predetermined time, and transmitted to the AND gate 27 of the driving circuit 17. As the result, after the ignition switch 71 is switched from the ON mode to the accessory mode and the engine is stopped, the breaker 11 is turned OFF after a predetermined time has passed, and the feeding path D is shut down.

Incidentally, in the case where the ignition switch 71 is switched from the ON mode to the OFF mode in which the accessory switch 30 is turned OFF, when the accessory switch 30 is turned OFF, the breaker 11 is turned OFF at once.

As described above, in also the present embodiment, the same effect as in the first embodiment can be obtained, and while the predetermined time has passed after the engine was stopped, the feed sockets A1 and A2 can be used, and when the engine 57 is stopped, there is no case in which the power feeding from the feed sockets A1 and A2 is suddenly stopped, which is convenient.

Incidentally, in each of embodiments, when the feeding path D is shut down, the feeding path is shut down without annunciating to the user, however it may also be allowable that an indicator lump for the report is provided on the feed sockets A1–Am or in the instrument panel, and via the indicator lump, the shutdown of the feeding path D is reported, or an alarm buzzer is provided and the shutdown of the feeding path D is reported.

According to the invention of the first aspect to the fifth aspect, when the engine is stopped, because the feeding path from the battery to the feed socket is shut down through the shutdown section by the engine stop detecting section, the use of the feed socket can be unallowable at the time of the engine stop, and the consumption of the battery at the time of the engine stop can be securely prevented.

According to the invention of the second aspect, because the feed socket can be used until a predetermined time has passed after the engine was stopped, there is no case in which the power feeding from the feed socket is suddenly stopped, which is convenient.

According to the invention of the third aspect, even after the engine is stopped, because the feed socket can be used until the integrating value of the feeding current amount from the feed socket reaches a predetermined reference value, the facility can be increased while the consumption of the battery is being prevented.

According to the invention of the fourth aspect, because the stop of the engine is detected according to the output signal of the regulator IC, for example, even when the engine is stopped by the en-st in the condition that the ignition switch is on the ON mode, the stop condition of the engine can be securely detected, and as the result, the consumption of the battery at the time of the engine stop can be securely prevented.

(5. Fifth Embodiment)

Figure 6:
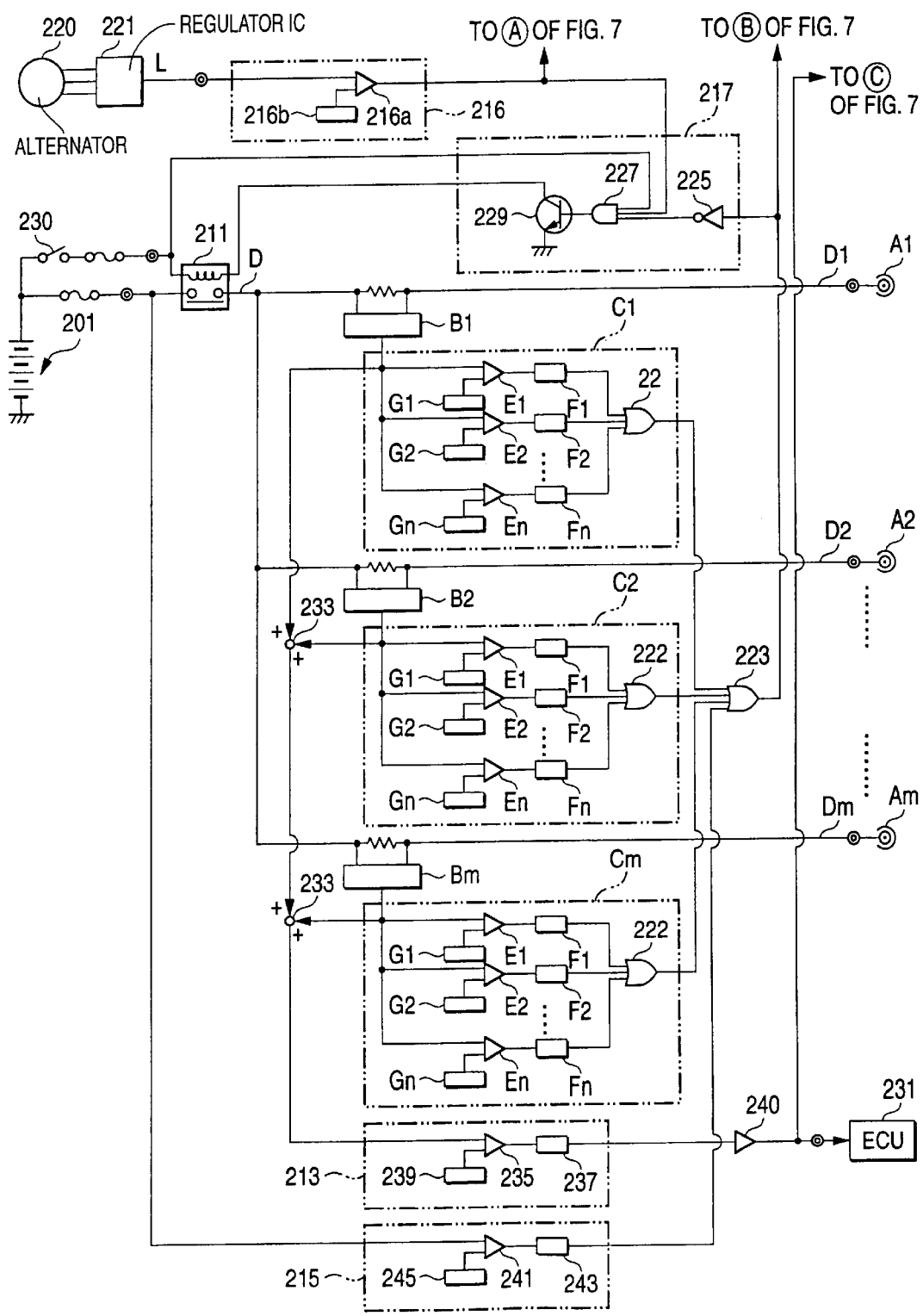
FIG. 6 is a block diagram of an automobile power source monitor according to the fifth embodiment of the present invention.
Figure 7:
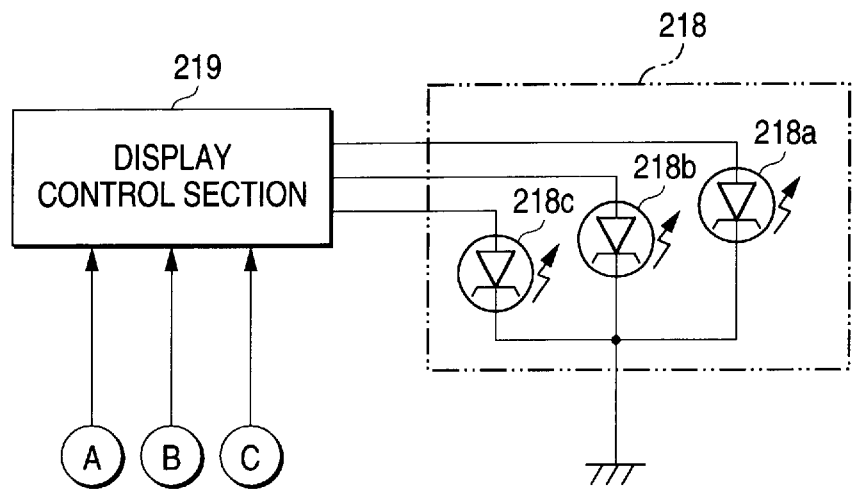
FIG. 7 is a block diagram of an annunciation section according to the fifth embodiment of the present invention.

FIG. 6 and FIG. 7 are block diagrams of an automobile power source monitor according to the fifth embodiment of the present invention. This automobile power source monitor is used for monitoring a supply condition of the electric power supplied to electric devices from a plurality of feed sockets A1–Am such as a cigar lighter socket, or accessory socket, connected to a battery 201, and is structured being provided with: a breaker (shutdown section) 211; a plurality of current detecting circuits (current detecting circuit) B1–Bm and over current detecting circuits (the first shutdown control section) C1–Cm, provided for each of feed sockets A1–Am; an idling-up instruction circuit (idling-up instruction section) 213; a low voltage detecting circuit (voltage detecting section and the second shutdown control section) 215; an engine stop detecting circuit (engine stop detecting section) 216; and a driving circuit 217 for driving the beaker 211; a display section (annunciation section) 218; and a display control section 219 to control the display section 218. Feed sockets A1–Am are provided at least one (herein, a plurality.of sockets) in the car room, and connection plugs for electric power receiving of each kind of electric devices are detachably connected.

The breaker 211 is a relay provided on a feeding path D from the battery 201 to each of feed sockets A1–Am, and by the control of the driving circuit 217, the feeding path D is made to pass or shut down the current. Incidentally, herein, the relay is used for the breaker 211, however, a switching element such as a transistor (for example, FET (Field Effect Transistor))maybe used. The feeding path D is branched into a plurality of branched paths D1–Dm on the downstream side of the beaker 211, and these branched paths are connected to each of feed sockets A1–Am.

The engine stop detecting circuit 216 is used for detecting the stop of the engine according to an output signal (L signal) outputted from a regulator IC 221 during the power generation of an alternator 220, and for shutting down the breaker 211 through the driving circuit 217 at the time of engine stop.

In more detail, herein, the L signal outputted from the regulator IC 221 is High level when the engine is operated and the power generation of the alternator 220 is conducted, and is switched to Low level as the engine is stopped and the power generation of the alternator 220 is stopped.

Corresponding to this, in the present embodiment, the engine stop detecting circuit 216 is provided with a comparator 215a, and by detecting a signal level of the L signal by the comparator 216a, the stop of the engine is detected.

In the comparator 216a, a predetermined reference level 216b is set, and the comparator 216a compares the signal level of the inputted L signal with the reference level 216b, and when the signal level of the L signal is High level and is higher than the reference level 216b, the High level signal is outputted to an AND gate 227 of the driving circuit 217, which will be described later, and on the one hand, when the signal level of the L signal is Low level and lower than the reference level 216b, the output signal to the AND gate 227 is switched from High level to the Low level so that the shutdown section 211 is made to shut down corresponding to that. Incidentally, the output signal of the comparator 216a, switched to the Low level, is switched to the High level as the operation of the engine is started again.

Each of current detecting circuits B1–Bm detects the value of the current flowing to each of feed sockets A1–Am through each of branched paths D1–Dm, and outputs a signal showing the detection value.

Each of over current detecting circuits C1–Cm is used for detecting the over current according to the detection value of each of current detecting circuits, and for operating the breaker 211 through the driving circuit 217, and is provided with a plurality of comparators E1–En which form a pair with each other, and filter circuits (timer circuits) F1–Fn, and an OR gate 222.

Each of comparators E1–En is used for judging the over current from an aspect of the magnitude of the current, and the reference levels G1–Gn showing the reference current values different from each other, which are criterions of the over current, are respectively set. Then, each of comparators E1–En compares the signal level of the signal outputted from the corresponding current detecting circuit with the set reference levels G1–Gn, and when the input signal level is not larger than the reference levels G1–Gn, the signal of the Low level is outputted, and on the one hand, when it is not smaller than the reference levels G1–Gn, the signal of the High level is outputted.

Each of filter circuits F1 is provided for judging the over current from an aspect of the flowing time of the current, and the setting times corresponding to the reference current values set in corresponding comparators E1–En are set. Then, each of filter circuits F1–Fn normally outputs the Low level signal, and only when the High level signal is inputted continuously for a time more than setting time set from the corresponding comparators E1–En, the High level signal is outputted.

An output condition of the High level signal of filter circuits F1–Fn is held, for example, for a period in which an accessory switch 230 is turned ON, and when the accessory switch 230 is tuned OFF, it is reset to an initial condition.

In the OR gate 222, when the High level signal is inputted from at least one of filter circuits F1–Fn in corresponding plural filter circuits F1–Fn, the output signal is switched from the Low level to the High level corresponding to that. Then, when the High level signal is outputted from the OR gate 222, the breaker 211 is shut down, as will be described later.

Figure 8:
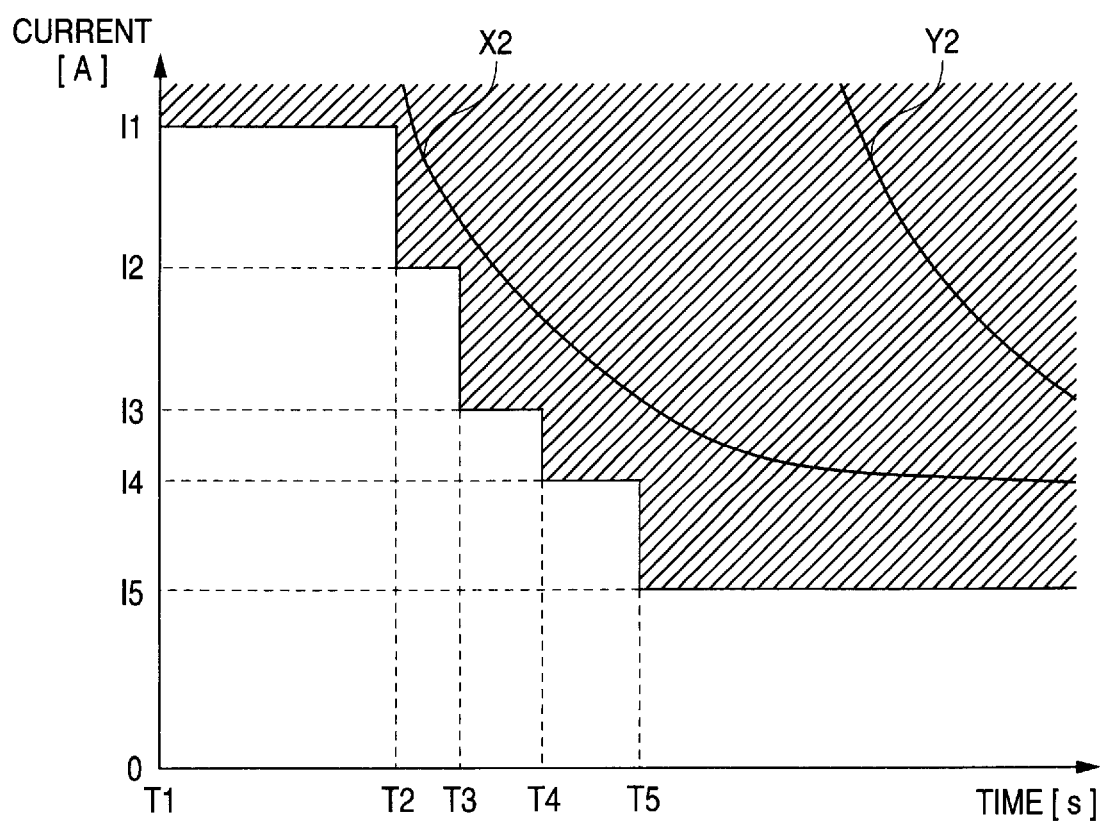
FIG. 8 is a view showing a plurality of reference current values and setting times for the judgement of the over current, set in the power source monitor in FIG. 6 and FIG. 7.
Figure 9:
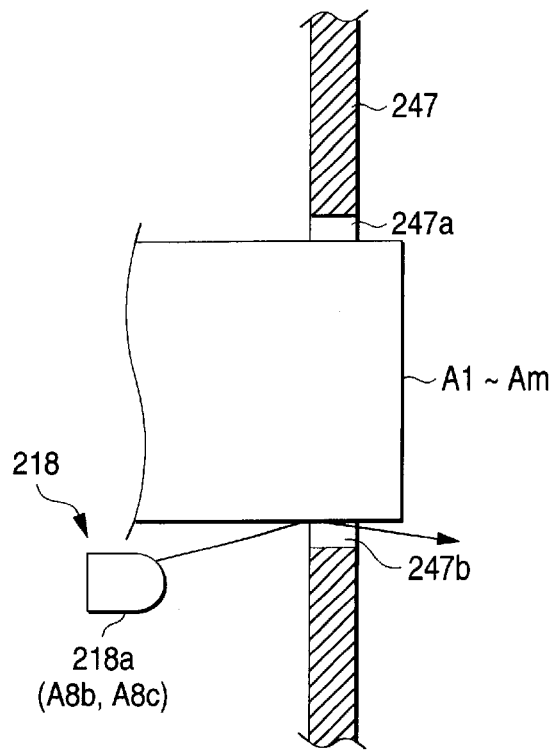
FIG. 9 is a sectional view showing the structure of a display section provided in the automobile power source monitor in FIG. 6 and FIG. 7.
Figure 10:
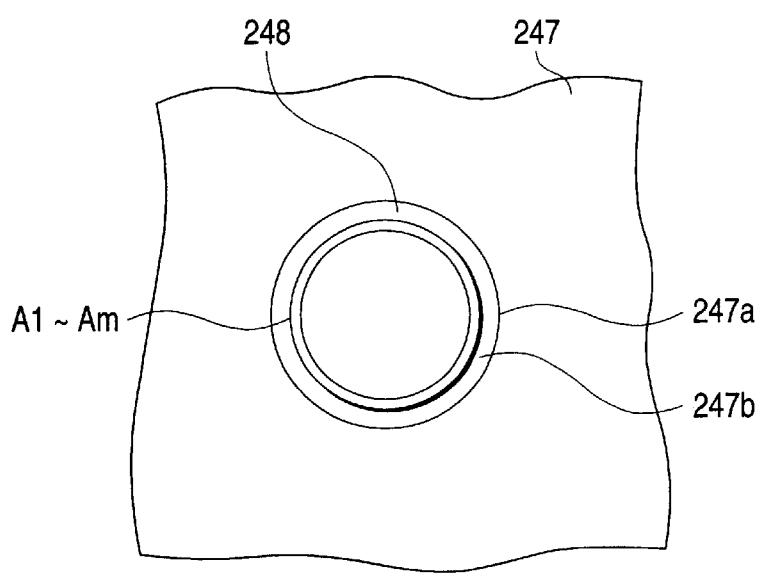
FIG. 10 is a front view showing the structure of a light emitting area in which the lighting display is conducted by the display section in FIG. 9.
Figure 11:
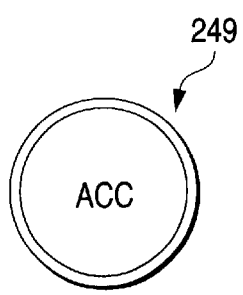
FIG. 11 is a view showing a symbol mark displayed by a modified example of the display section provided in the automobile power source monitor in FIG. 6 and FIG. 7.

Herein, according to the following Table 2 and FIG. 8, an example of setting of a plurality of reference current values and setting times, is shown. In this example, in each of comparators E1–En and each of filter circuits F1–Fn of each of over current detecting circuits C1–Cm, as shown in Table 2, 5 sets of reference current values I1–I5, and setting times T1–T5 are set.

TABLE 2

|  | Condition | | | | |
| --- | --- | --- | --- | --- | --- |
|  | I | II | III | IV | V |
| Reference current value [A] | I1 | I2 | I3 | I4 | I5 |
| Allowable time [s] | T1 | T2 | T3 | T4 | T5 |

In FIG. 8, a hatched area shows an area in which the current is judged to be over current under this setting example, by the over current detecting circuits C1–Cm, and a graph X2 is a graph showing the fusing characteristic of a fuse with 15 A capacity, and a graph Y2 showing the smoke characteristic of a copper wire with the 0.85 mm diameter. That is, in the present embodiment, 5 sets of reference current values I1–I5 and setting times T1–T5 as shown in FIG. 7, are set in such a manner that these simulate the fusing characteristic of the fuse with 15 A capacity. Herein, the setting time T1 corresponding to the reference current value I1 is set to 0, and when the current value flowing from each of feed sockets A1–Am is not smaller than the reference current value I1, the breaker 211 is shut down at once.

Incidentally, herein, 5 sets of reference current values I1–I5, and setting times T1–T5 are set in such a manner that these simulate the fusing characteristic of the fuse with 15 A capacity, however, it may also be allowable to be set so that these simulate the smoke characteristic of the copper wire of 0.85 mm diameter.

The idling-up instruction circuit 213 is a circuit to detect an increase of the supply current according to the total sum of the current flowing through each of feed sockets a1–Am, and to output an idling-up instruction of a predetermined level to the engine control unit 231, and is composed of addition circuit 233, comparator 235 and filter circuit 237.

The addition circuit 233 receives signals outputted from each of current detecting circuits B1–Bm, and adds the current values detected by each of current detecting circuits B1–Bm, and outputs the signal corresponding to the value after its addition.

Comparator 235 is a component to judge the necessity and not of the idling-up from an aspect of the magnitude of the current, and the reference level 239 showing the reference current value as the criterion is set therein. Then, the comparator 235 compares the signal level of the signal outputted from the addition circuit 233 with the reference level 239 set therein, and when the input signal level is not larger than the reference level 239, the comparator 235 outputs the signal of Low level, and on the one hand, when it is not smaller than the reference level 239, the comparator 235 outputs the signal of High level.

The filter circuit 237 judges the necessity or not of the idling-up from the flowing time of the current, and the setting time corresponding to the reference current value set in the comparator 235 is set therein. Then, the filter circuit 237, normally, outputs the signal of Low level, and only when the signal of High level is continuously inputted for a time more than a setting time set from the corresponding comparator 235, the signal of High level (idling-up instruction) is outputted. The output condition of the High level signal of the filter circuit 237 is held, for example, for a period in which the accessory switch 230 is turned ON, and when the accessory switch 230 is turned OFF, it is reset to the initial condition.

That is, in the present embodiment, the idling-up reference is determined by the reference current value set in the comparator 235 and the setting time set in the filter circuit 237.

The output signal from the filter circuit 237 is inputted into the engine control unit 231 through an amplifier 240, and when the signal of High level is outputted from the filter circuit 237, the engine control unit conducts the idling-up of a predetermined level according to that, and as the result, the power generation amount of the alternator is increased by the predetermined level of amount.

The low voltage detecting circuit 215 is a circuit to detect that the output voltage of the battery 201 is lowered lower than a predetermined reference level, and shut down the breaker 211, and is provided with the comparator 241 and the filter circuit 243. The comparator 241 is connected to the feeding path D on the upstream side of the breaker 211, and successively detects the output voltage of the battery 201 through the connection point to the feeding path D, and compares the detected output voltage with the reference voltage value shown by the reference level 245 set therein, and when the output voltage is not larger than the reference voltage, the signal of Low level is outputted, and on the one hand, when it is not smaller than the reference voltage, the signal of High level is outputted.

A predetermine setting time is set in the filter circuit 243. The filter circuit 243, normally, outputs the signal of Low level, and only when the signal of High level is continuously inputted for a time more than a setting time set from the comparator 241, the signal of High level is outputted so that the breaker 211 is shut down. The output condition of the High level signal of the filter circuit 243 is held, for example, for a period in which the accessory switch 230 is turned ON, and when the accessory switch 230 is turned OFF, it is reset to the initial condition.

The driving circuit 217 is a circuit to drive and control the breaker 211 according to the output signal of the comparator 216a of the engine stop detecting circuit 216, the output signal of the OR gate 222 of each of the over current detecting circuits C1–Cm, the output signal of the filter circuit 243 of the low voltage detecting circuit 215, and the accessory power source signal which will be described later, and is provided with an OR gate 223, inverter 225, AND gate 227, and transistor 229.

The current flowing, and shutdown conditions of the breaker 211 are switched depending on ON and OFF of the transistor 229, and the transistor 229 is turned ON and OFF by the output signal of the AND gate 227.

On the one hand, the output signal from each of over current detecting circuits C1–Cm and the low voltage detecting circuit 215, is inputted into the OR gate 223, and the output signal from the OR gate 223 is inputted into the first input terminal of the AND gate 227 through the inverter 225. Further, the output signal of the comparator 216a of the engine stop detecting circuit 216 and the signal (accessory power source signal) switched between the High and Low according to ON and OFF of the accessory switch 230, are inputted into the second and the third input terminals of the AND gate 227.

The AND gate 227 makes the output signal to the transistor 229 High level, only when all of these 3 signals inputted into the first to the third input terminals are High level, and in the other case, the output signal to the transistor 229 is made Low level. Thereby, the breaker 211 is driven and controlled by these 3 signals inputted into the AND gate 227.

The display section 218 is structured being provided with a plurality of (herein, 3 of the first to the third) light emitting elements (herein, LED) 218a, 218b and 218c, emitting the light of colors different from each other (herein, blue, yellow, and red), and herein, it is provided for each of feed sockets A1–Am. Each of light emitting elements 218a, 218b and 218c of each display section 218 is provided on the rear surface side of the portion of the panel member 247 on which corresponding feed sockets A1–Am are provided.

In the case where each of light emitting elements 218a, 218b and 218c is turned ON, when the light emitted by each of light emitting elements 218a, 218b and 218c outgoes to the front surface side, through the light transmission section (gap section) 247b provided between the inner peripheral portion of the socket arrangement hole 247a of the panel member 247 and the feed sockets A1–Am arranged in the socket arrangement hole 247a, as shown in FIG. 5, the ring-like light emitting area 248 on the outer periphery of the feed sockets A1–Am is tuned ON by the color of the light emitted by the light emitting elements 218a, 218b and 218c. Then, in the present embodiment, by the light emitting condition (specifically, lighting color) of the light emitting area 248, the power source control operation is displayed.

As described above, when the light emitting area 248 is provided on the outer peripheral portion of the feed sockets A1–Am, the power source control operation can be displayed on easy seeing condition, and also in the night, the position of the feed socket can be easily recognized. In this connection, in the present embodiment, the light emitting area 248 is provided on the on the outer peripheral portion of the feed sockets A1–Am, however, it may be provided on the other portion.

The output signal outputted from the engine stop detecting circuit 216 and the OR gate 223 to the drive circuit 217 is inputted into the display control section 219, and the idling-up instruction outputted from the idling-up instruction circuit 213 to the engine control unit 231 is inputted into the display control section 219.

Then, when each of the light emitting elements 218a, 218b and 218c is individually on/off-controlled and the lighting color of the light emitting area 248 corresponding to each of feed sockets A1–Am is switched, the display control section 219 displays the power source control operation of the power source monitor.

Specifically, under the condition that the engine is operated, the output signal from the engine stop detecting circuit 216 is on High level, the supplied current from each of feed sockets A1–Am is not the over current, there is no lowering of the output voltage of the battery lower than a predetermine reference level, the output voltage of the OR gate 223 is on Low level, the total sum of the supplied current from each of feed sockets A1–Am does not exceed a predetermined idling-up reference, and the idling-up by the idling-up instruction circuit 213 is not conducted, (that is, under the condition that the feeding path D is not shut down by the breaker 211 and the idling-up is not conducted), a blue light emitting element 218a of each of display sections is turned ON, thereby, each of light emitting areas 248 is turned ON into the blue, and it is displayed that each of feed sockets A1–Am can be used.

Then, under this condition, the total sum of the supplied current from each of feed sockets A1–Am exceeds the predetermined idling-up reference, and when the idling-up instruction is outputted from the idling-up instruction circuit 213, corresponding to this, the blue light emitting element 218a is replaced by the yellow light emitting element 218b of each of display sections 218 and is turned ON by the display control section 219, thereby, the lighting color of each of light emitting area 248 is switched from blue to yellow, and it is displayed that the idling-up is conducted.

Further, when the stop of the engine, the over current in any one of feed sockets A1–Am, or the lowering of the battery voltage occurs, thereby, the output signal of the engine stop detecting circuit 216 is switched from High level to Low level, or the output signal of the OR gate 223 is switched from Low level to High level and the feeding path D is shut down by the breaker 211, following this, the red light emitting element 218c of each of display sections 218 replaces the blue or yellow light emitting elements 218a or 218b, and is turned ON, thereby, the lighting color of each light emitting area 248 is switched from the blue or yellow to the red, and it is displayed that each of feed sockets A1–Am is shut down.

In this connection, when the accessory switch 230 is turned OFF, and the power source monitor is tuned OFF, each of light emitting elements 218a, 218b, and 218c of each of display sections 218 is turned OFF.

Next, the operation of this power source monitor will be described. When the ignition switch is switched from the OFF mode to the accessory mode to turn ON the accessory switch 230, and is further switched to the start mode to start the engine, and the engine is started, and it is set to the ON mode to continue the drive of the engine, then, according to this, the High level accessory power source signal is inputted into the third input terminal of the AND gate 227 of the driving circuit 217, and the High level output signal from the engine stop detecting circuit 216 is inputted into the second input terminal of the AND gate 227.

At this time, at the time of normal case where there is no over current and no lowering of the output voltage of the battery 201, all of the output signals of each of the over current detecting circuits C1–Cm, and the low voltage detecting circuit 215 are in Low level, and the signal inputted into the first input terminal of the AND gate 227 from the OR gate 223 through the inverter 225, is in High level.

As the result, the transistor 229 is turned ON, thereby, the circuit from the positive terminal of the battery 201 to the ground through an accessory switch 230, an electromagnetic coil of the breaker 211, and transistor 229, has the continuity, and the electromagnetic coil of the breaker 211 is electrically excited and the contact of the breaker 211 is turned ON, and the feeding path D has the continuity, thereby, each of feed sockets A1–Am is on a usable condition.

Further, at this time, because the output signals of the engine stop detecting circuit 216 and the OR gate 223 which are inputted into the display control section 219, are respectively on High level and Low level, in each of display section 218, the blue light emitting element 218a is turned ON, and each of light emitting area 248 is turned ON to blue.

Then, on this condition, when the ignition switch is switched from the ON mode to the accessory mode, or the engine is stopped by an en-st, and the L signal outputted from the regulator IC 219 is switched from the High level to the Low level, according to this, the output signal from the comparator 216a of the engine stop detecting circuit 216 is switched from the High level to the Low level, thereby, the output signal of the AND gate 227 is switched from the High level to the Low level, and the transistor 229 is turned OFF, the breaker 211 is turned OFF, and the feeding path D is shut down, and until the engine is operated again, each of feed sockets A1–Am can not be used.

Further, following this, by the display control section 219, it is detected according to the switching from the High level to the Low level of the output signal of the engine stop detecting circuit 216 that each of fed sockets A1–Am is shut down, and the red light emitting element 218c of each of display sections 218 is turned ON instead of the blue light emitting element 218a, thereby, the lighting color of each of display areas 248 is switched from the red to the blue.

This shutdown condition of each of feed sockets A1–Am is released when the engine is started again and the output signal of the engine stop detecting circuit 216 is switched from the Low level to the High level, and further, following this, the lighting color of each of display areas 248 is switched from red to blue.

Further, when the value of the current flowing through any one of feed sockets A1–Am is larger than the reference current value set in any one of comparators E1–En of the over current detecting circuits C1–Cm corresponding to the feed sockets A1–Am, and the condition that it is over the reference current value, is continued for the time more than setting time set in the filter circuits F1–Fn corresponding to any one of comparators E1–En, the output signal of the filter circuits F1–Fn is switched from the Low level to the High level, and according to this, the output signal from the OR gate 222 of the over current detecting circuits C1–Cm corresponding to the feed sockets A1–Am is switched from the Low level to the High level, and the output signal of the OR gate 223 is switched from the Low level to the High level. As the result, the output signal of the AND gate 227 is switched from the High level to the Low level, the transistor 229 is turned OFF, and the breaker 211 is turned OFF, the feeding path D is shut down, and the consumption of the battery 201 by the over current is prevented.

Further, when the output voltage of the battery 201 becomes a condition lower than the reference voltage value set in the comparator 241 of the low voltage detecting circuit 215, and this condition continues for a time longer than the setting time set in the filter circuit 243, the output signal from the filter circuit 243 is switched from the Low level to the High level, and according to this, the output signal of the OR gate 223 is switched from Low level to the High level, thereby, the output signal of the AND gate 227 is switched from the High level to the Low level, the transistor 229 is turned OFF, the breaker 211 is turned OFF, and the feeding path D is shut down, and the excessive lowering of the output voltage of the battery 201 is prevented.

As described above, when the feed sockets A1–Am are shut down due to the over current or the lowering of the battery voltage, it is detected according to the switching of the output of the OR gate 223 from the Low level to the High level by the display control section 219 that each of feed sockets A1–Am is shut down, and the red light emitting element 218c of each of display section 218 is turned ON instead of the blue light emitting element 218a, thereby, the lighting color of each of display areas 248 is switched from blue to red.

Herein, when the High level output signal is outputted from the filter circuits F1–Fn, and 243, because the output condition of this High level is held until the accessory switch 230 is turned OFF, the output signal of the OR gate 223 is also held in the High level status until the accessory switch 230 is turned OFF. Further, when the accessory switch 230 is turned OFF, the engine is also inevitably stopped.

Accordingly, when the breaker 211 is turned OFF by the over current or the lowering of the output voltage of the battery 201, until the user switches once the ignition switch from the ON mode to the OFF mode in which the accessory switch 230 is turned OFF, and is switched again to the start mode to start the engine and the ON mode, and the engine is started again, the breaker 211 is held in the condition that it remains OFF, and the lighting color of each of light emitting areas 248 is held on the red. In this connection, the lighting color of each of light emitting areas 248 is switched from the red to the blue when the shutdown condition of the breaker 211 is released.

Further, even when the current is not judged to be over current in each of over current detecting circuits C1–Cm, when the total sum of the current flowing from each of feed sockets A1–Am is larger than the reference current value set in the comparator 235 of the idling-up instruction circuit 213, and this condition continues for the time more than setting time set in the filter circuit 237, the output signal from the filter circuit 237 is switched from the Low level to the High level. According to this, the predetermined level of the idling-up is conducted by the engine control unit 231, and the power generation amount of the alternator is increased.

According to this, by the display control section 219, it is detected that the idling-up is conducted according the idling-up instruction outputted from the idling-up instruction circuit 213, and the yellow light emitting element 218b of each of the display portions 218 is turned ON instead of the blue light emitting element 218a, thereby, the lighting color of each of display areas 248 is switched from the blue to the yellow.

As described above, according to the present embodiment, by visually confirming the lighting color of the light emitting area 248 of each of feed sockets A1–Am, the user can be easily recognize that the normal use of each of feed sockets A1–Am is possible, each of feed sockets A1–Am is shut down by the engine stop, the over current, or the lowering of the battery voltage, and the idling-up is conducted by an increase of the supplied current from each of feed sockets A1–Am, and can take an appropriate counter measure.

Specifically, in the present embodiment, because it is displayed by the lighting color of each of light emitting areas 248 that the idling-up is conducted, the user can easily recognize that the idling-up is conducted, and can take an appropriate counter measure such as the saving of the power consumption.

Incidentally, in the present embodiment, although the display relating to the power source control operation is conducted by each of light emitting areas 248 on the outer peripheral portion of each of the feed sockets A1–Am, a predetermined symbol mark 249 for the power source control operation display as shown in FIG. 6 is displayed on the instrument panel portion on the front of the driver sheet, and by switching the display color of the symbol mark 249 to the blue, yellow, or red, in the same manner as in the light emitting areas 248, the display for the power source control operation may also be conducted. In this case, the switching of the display color is conducted by arranging the display section 218 on the rear surface side of the display panel on which the light transmitting pattern corresponding to the symbol mark 249 is provided, and by switching the light emitting elements 218a, 218b, and 218c to illuminate the light transmitting pattern.

Further, in the present embodiment, by switching the lighting color of the light emitting areas 248, the display for the power source control operation is conducted, however, the display for the power source control operation may be conducted by turning ON the light emitting areas 248, by turning OFF the light emitting areas 248, or by flickering them.

Further, in the present embodiment, although the display for the power source control operation by the light through the light emitting areas 248 is conducted, instead of the display by the light of the light emitting areas 248, or together with the display by the light of the light emitting areas 248, the power source control operation such as the shutdown of feed sockets A1–Am may also be informed by a sound (or a voice) outputted by an annunciation section such as a buzzer or a speaker arranged at a predetermined portion in the car room. In this case, the output control of the annunciation section is conducted by the display control section 219.

(6. Sixth Embodiment)

Figure 12:
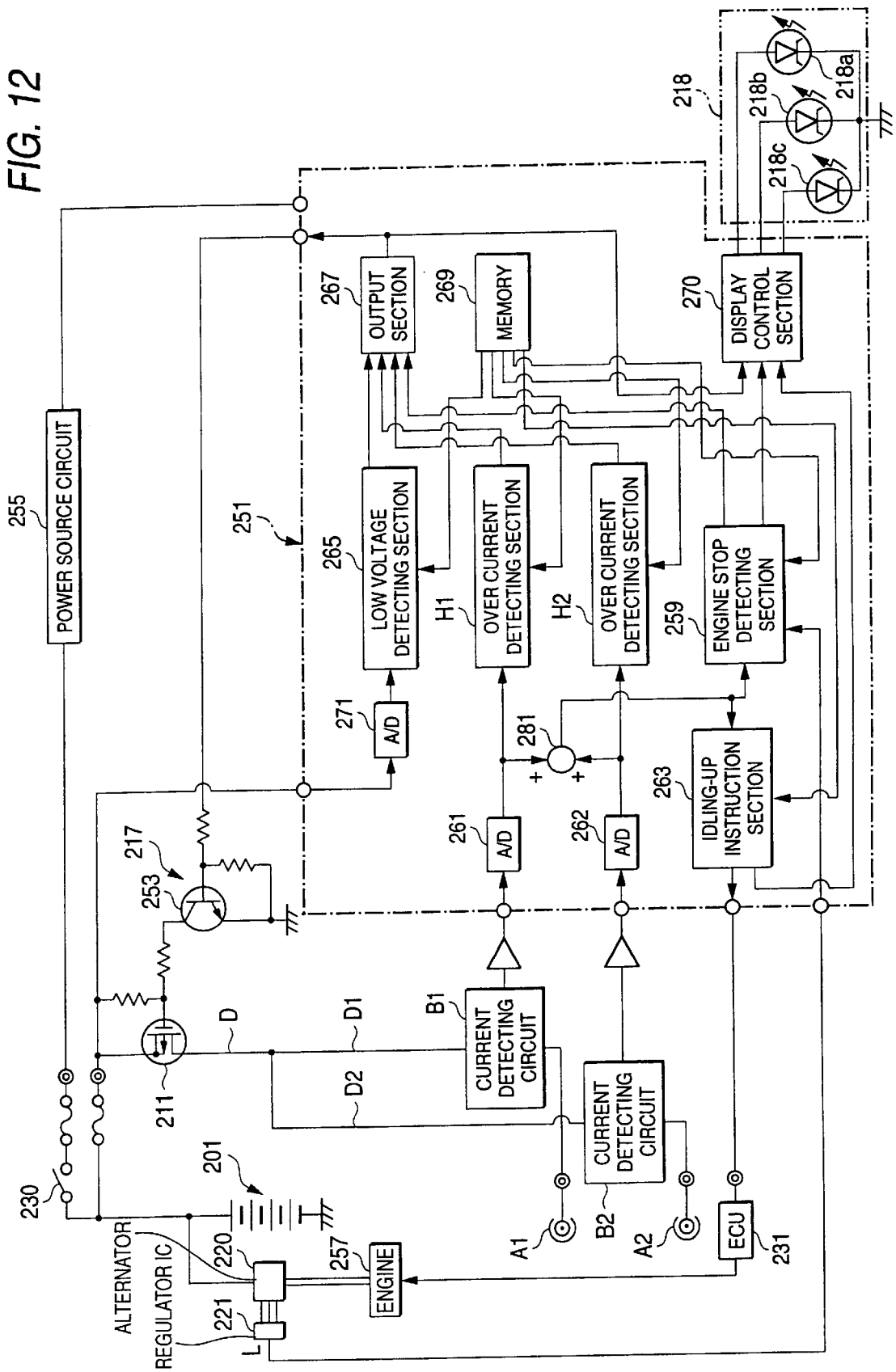
FIG. 12 is a block diagram of the automobile power source monitor according to the(sixth embodiment of the present invention.

FIG. 12 is a block diagram of the automobile power source monitor according to the sixth embodiment of the present invention. In the power source monitor according to the present embodiment, the function corresponding to the engine stop detecting circuit 216, over current detecting circuits C1–Cm, idling-up instruction circuit 213, low voltage detecting circuit 215, and display control section 219 according to the fifth embodiment, is included in a microcomputer 251. In this connection, in the present embodiment, portions corresponding to the fifth embodiment have the same reference numerals and signs.

Incidentally, herein, a case where 2 feed sockets A1 and A2 are provided, will be described. Further, in the present embodiment, as the breaker 211, a field effect transistor (FET) is used, but, a relay switch may be used. The breaker 211 is driven by a driving circuit 217 including a transistor 253. To the microcomputer 251, the power source is supplied by a power circuit 255 connected to the battery 201 through the accessory switch 230. Further, in FIG. 7, the engine is shown by a numeral 257.

The microcomputer 251 is, mainly, provided with: an engine stop detecting section 259 provided corresponding to the engine stop detecting circuit 216; a plurality of (herein, two) over current detecting sections H1 and H2 provided corresponding to each of current detecting circuits B1 and B2; an adding section 261; an idling-up instruction section 263; a low voltage detecting section 265; an output section 267; a memory 269; and a display control section 270.

In the engine stop detecting section 259, in the same manner as in the fifth embodiment, the L signal outputted from the regulator IC 221 is inputted, and the engine stop detecting section 259 is detects the stop of the engine 257 according to the inputted L signal. In more detail, by detecting the switching of the inputted L signal from the High level to the Low level, and the switching from the Low level to High level, the stop and the start of the engine 257 are detected.

Then, in the present embodiment, when the engine stop detecting section 259 detects the stop of the engine 257 according to the L signal, according to this, it reports that the engine 257 is stopped, to the display control section 270, and on the other hand, as the delay processing, the total sum of the supplied current amount from the feed sockets A1 and A2 shown by signals inputted from the addition section 251 is integrated, and when the integration value exceeds a predetermined reference value previously set in the memory 269, the shut down instruction is outputted to make the FET 211 turn OFF. Herein, when the shutdown instruction is outputted from the engine stop detecting section 259, that effect is reported to the display control section 270 through the output section 267.

In this connection, when the engine 257 is restarted before the integration value reaches the predetermined reference value, the integration operation of the supplied current value is cancelled, and the FRT 211 is not turned OFF. Further, when the engine stop detecting section 259 detects the start of the engine 257, it reports that effect to the display control section 270.

Therefore, even when the engine 257 is stopped, the FET 211 is not turned OFF at once, and after the engine 257 is stopped, when the integration value of the supplied electric power value supplied from each of feed sockets A1 and A2 exceeds the predetermined reference value, the FRT 211 is turned OFF.

In the memory 269, a plurality of the first reference current values which are criterions of the over current, and a plurality of the first setting times corresponding to the each of the first reference current values, are correspond to 1 to 1, and are previously stored. Further, in the memory 269, the second reference current value which is the criterion of the necessity or not of the idling-up, and the second setting time corresponding to the second reference current value, are previously stored, and the reference voltage value which is the criterion of the occurrence or not of the lowering of the output voltage of the battery 201, and the third setting value corresponding to the reference voltage value, are previously stored. The point to set these first and second reference current values, reference voltage value and the first to third setting times, is the same as in the fifth embodiment.

Each of over current detecting sections H1 and H2 successively recognizes the current value flowing through each of feed sockets A1 and A2, according to the signals inputted through the A/D converters J1 and J2 from each of current detecting circuits B1 and B2 corresponding to the over current detecting sections H1 and H2, and compare the current value to each of the first reference current values stored in the memory 269, and when the current value is larger than any one of the first reference current values, the count operation of the passing time is started.

Then, while each of over current detecting sections H1 and H2 conducts the count operation of the passing time, each of over current detecting sections H1 and H2 successively judges whether the counted passing time is more than the first setting time, stored in the memory 269, corresponding to any one of the first reference current value, and when the counted passing time is more than the corresponding first setting time, each of over current detecting sections H1 and H2 gives the instruction (shutdown instruction) to turn OFF the FET 211 to an output section 267, which will be described later, and on the one hand, when the current value is not larger than any one of the first reference current values, before the passing time is more than the corresponding first setting time, the count operation is stopped and the count value is reset. Herein, when the shutdown instruction is outputted from each of over current detecting sections H1 and H2, that effect is reported to the display control section 270 through the output section 267.

When the shutdown instruction is outputted once from each of over current detecting sections H1 and H2, the shutdown instruction is held until the accessory switch 230 is turned OFF, and when the accessory switch 230 is turned OFF, the instruction is removed according to that.

The addition section 261 adds the current value flowing through each of feed sockets A1 and A2, according to the signals inputted through the A/D converters J1 and J2 from each of current detecting circuits B1 and B2, and gives it to the idling-up instruction section 263.

The idling-up instruction section 263 successively recognizes the total sum of the total current value flowing via feed sockets A1 and A2 through the addition section 261, and compares the total current value to the second reference current value stored in the memory 269, and when the total current value is larger than the second reference current value, the count operation of the passing time is started.

Then, while the idling-up instruction section 263 conducts the count operation of the passing time, the idling-up instruction section 263 successively judges whether the counted passing time is more than the second setting time, stored in the memory 269, and when the counted passing time is more than the second setting time, the idling-up instruction to instruct the predetermined level of the idling-up is outputted to the engine control unit 231, and on the one hand, when the total current value is not larger than the second reference current value, before the passing time is more than the second setting time, the count operation is stopped and the count value is reset. Herein, when the idling-up instruction section 268 outputs the idling-up instruction, the idling-up instruction section 263 reports the effect to the display control section 270.

The low voltage detecting section 265 successively recognizes the output voltage value of the battery 201, according to the signal given from the A/D converter 271 connected to the upstream side of the FET 211 of the feeding path D, and compares the output voltage value to the reference voltage value stored in the memory 269, and when the output voltage value is larger than the reference voltage value, the count operation of the passing time is started.

Then, while the low voltage detecting section 265 conducts the count operation of the passing time, it successively judges whether the counted passing time is more than the third setting time stored in the memory 269, and when the counted passing time is more than the third setting time, the low voltage detecting section 265 gives the instruction (shutdown instruction) to turn OFF the FET 211 to an output section 267, which will be described later, and on the one hand, when the output voltage value is not larger than the reference voltage values, before the passing time is more than the third setting time, the count operation is stopped and the count value is reset. Herein, when the shutdown instruction is outputted from the low voltage detecting section 265, the effect is reported to the display control section 270 though the output section 267.

When the shutdown instruction is outputted once from the low voltage detecting section 265, the shutdown instruction is held until the accessory switch 230 is turned OFF, and when the accessory switch 230 is turned OFF, according to that, the shutdown instruction is released.

In the condition in which the accessory switch 230 is turned ON, and the shutdown instruction is not outputted from any one of the engine stop detecting section 259, each of the over current detecting section H1 and H2, and the low voltage detecting section 265, (that is, the condition in which the engine 257 is operated, (or the condition before a predetermined electric power amount is consumed through feed sockets A1 and A2, after the engine 257 is stopped), and the condition in which there is no over current and no voltage lowering of the battery 201), the output section 267 outputs the High level signal so as to turn ON the FET 211. Then, when the accessory switch 230 is turned OFF, or the shutdown signal is inputted from at least one of the engine stop detecting section 259, each of the over current detecting sections H1, H2, and the low voltage detecting section 265, the output section 267 switches the output signal from the High level to the Low level, corresponds to this.

The output signal of the output section 267 is inputted into the transistor 253 of the driving circuit 217, and when the output signal of the output section 267 is switched between the High level and the Low level, being interlocked with ON or OFF of the transistor 253 according to this, the FET 211 is turned ON or OFF, thereby, the feeding path D has the continuity or is shut down.

According to the communication that the shutdown instruction given from the over current detecting sections H1, H2, the low voltage detecting section 265 and the engine stop detecting section 259 through the output section 267 is outputted, the communication that the idling-up instruction given from the idling-up instruction section 263 is outputted, and the communication that the engine 257 is stopped, given from the engine stop detecting section 259, in almost the same manner as in the fifth embodiment, the display control section 270 ON/OFF-controls each of light emitting elements 218a, 218b and 218c of the display section 218, and by switching the lighting color of the light emitting area 248 corresponding to each of feed sockets A1–Am, it conducts the display of the power source control operation of the power source monitor.

Specifically, in the condition that the engine is operated, the supplied current from each of feed sockets A1–Am is not the over current, there is no lowering of the battery voltage, and the total sum of the supplied current from each of feed sockets A1–Am does not exceed a predetermined idling-up reference, the blue light emitting element 18a of each of display sections 218 is turned ON, and each of light emitting areas 248 is turned ON to blue.

Then, in this condition, when the total sum of the supplied current from each of feed sockets A1–Am exceeds the predetermined idling-up reference and the idling-up instruction is outputted from the idling-up instruction section 263, or when the engine 257 is stopped, and the communication that the engine 257 is stopped, is given from the engine stop detecting section 259, corresponding to this, the yellow light emitting element 218b of each of display sections 218 is turned ON instead of the blue light emitting element 218a, thereby, the lighting color of each of light emitting areas 248 is switched from the blue to the yellow, and it is displayed that the idling-up is conducted, and the engine 218 is stopped.

Further, when the over current in any of feed sockets A1–Am, or the lowering of the battery voltage occurs, or when, after the engine 257 is stopped, the communication that a predetermined amount of the electric power is consumed through the feed sockets A1–Am, and the shutdown instruction is outputted from the over current detecting sections H1, H2, low voltage detecting section 265 or engine stop detecting section 259 through the output section, is given, corresponding to this, the red light emitting element 218c of each of display sections 218 is turned ON instead of the blue or yellow light emitting element 218a or 218c, thereby, the lighting color of each of light emitting areas 248 is switched from blue or yellow to red, and it is displayed that each of feed sockets A1–Am is shut down.

In this connection, when the accessory switch 230 is turned OFF and the power source monitor is turned OFF, each of light emitting elements 218a, 218b and 218c of each of display sections 218 is turned OFF.

Next, the operation of this power source monitor will be described. When the ignition switch is switched from the OFF mode to the accessory mode to turn ON the accessory switch 230, and is further switched to the start mode to start the engine and the engine is started, and the ignition switch is set to ON mode to continue the drive of the engine 257, according to this, the shutdown instruction outputted from the engine stop detecting section 259 of the control section 251 is released.

At this time, in the normal case in which there is no over current and no lowering of the output voltage of the battery 231, because the shutdown instruction is not outputted from each of over current detecting sections H1, H2, and the low voltage detecting section 265, according to the start of the engine 257, the output signal of the output circuit 267 is switched from the Low level to the High level, and the transistor 253 of the driving circuit 217 is turned ON, thereby, the FET is turned ON, and each of feed sockets A1–Am becomes a usable condition. Further, at this time, in each of display sections 218, the blue light emitting element 218a is turned ON by the control of the display control section 270, and each of light emitting areas 249 is turned ON to blue.

Then, in this condition, when the ignition switch is switched from ON mode to the accessory mode, or the engine is stopped by the en-st, and the L signal outputted from the regulator IC 221 is switched from the High level to the Low level, according to this, it is detected by the engine stop detecting section 259 that the engine 257 is stopped.

When the stop of the engine 257 is detected by the engine stop detecting section 259, by the engine stop detecting section 259, the communication that the engine 257 is stopped, is given to the display control section 270, and on the other hand, the integration processing of the total sum of the supplied current amount from each of feed sockets A1 and A2 shown by the signal inputted from the addition section 261 is started. At this time, by the display control section 270, in each of display sections 218, the yellow light emitting element 218b is turned ON instead of the blue light emitting element 218a, and the lighting color of each of light emitting area 249 is switched from blue to yellow.

After the stop of the engine 257, when the integration value of the total sum of the supplied current value from each of feed sockets A1 and A2 exceeds the predetermined reference value previously set in the memory 269, at that time point, the shutdown instruction is outputted from the engine stop detecting section 259, and the output signal of the output section 267 is switched from the High level to the Low level, thereby, the transistor 253 is turned OFF, the FET 211 is turned OFF, and the feeding path is shut down, and each of feed sockets A1–Am can not be used until the engine is operated again. At this time, in each of display sections 218, by the control of each of display control sections 270, the red light emitting element 218c is turned ON instead of the yellow light emitting element 218b, and the lighting color of each of light emitting areas 249 is switched from yellow to red.

This shutdown condition of each of the feed sockets A1 and A2 by the stop of the engine 257 is removed as the engine is restarted and the shutdown instruction from the engine stop detecting section 259 is removed, and further, according to this, the lighting color of each of light emitting areas 248 is also switched from red to blue.

Further, when the value of the current flowing through any one of the fed sockets A1 and A2 is larger than any one of the first reference current values stored in the memory 269, and this larger condition continues for a time more than the first setting time corresponding to the first reference current values stored in the memory 269, the shutdown instruction is outputted from the over current detecting sections H1 and H2 corresponding to the feed sockets A1 and A2, and the output signal of the output section 267 is switched from the High level to the Low level, thereby, the transistor 253 is turned OFF, the FET 211 is turned OFF and the feeding path D is shut down, and the consumption of the battery 201 by the over current is prevented.

Further, when the output voltage of the battery 201 is not larger than the reference voltage value stored in the memory 269, and that condition continues for a time more than the third setting time stored in the memory 269, the shutdown instruction is outputted from the low voltage detecting section 265, and the output signal of the output section 267 is switched from the High level to the Low level, thereby, the transistor 253 is turned OFF, and the FET 211 is turned OFF and the feeding path D is shut down, and the excessive lowering of the output voltage of the battery 201 is prevented.

In this manner, when the FET 211 is turned OFF by the over current or the output lowering of the battery 201, corresponding to this, in each of display sections 218, by the control of the display control section 270, the red light emitting element 218c is turned ON instead of the blue or yellow light emitting element 218a or 218b, thereby, the lighting color of each of light emitting areas 248 is switched from blue or yellow to red.

Further, in this manner, the return of the FET 211 in the case where the FET 211 is turned OFF by the over current or the output lowering of the battery 201, is conducted, after the ignition switch is switched from the ON mode to the OFF mode and the accessory switch 230 is turned OFF and the shutdown instruction outputted from the over current detecting sections H1 and H2 is removed, when the ignition switch is switched to the start mode and the ON mode, and the accessory switch 230 is tuned ON and the engine 257 is restarted. When the FET 211 is returned, corresponding to this, by the control of the display control section 270, the lighting color of each of light emitting areas 248 is switched from red to blue.

Further, even when the current is not judged to be over current in each of over current detecting sections H1 and H2, when the total sum of the current flowing from each of feed sockets A1–Am is larger than the second reference current value stored in the memory 269, and that condition continues for the time more than second setting time stored in the memory 269, the idling-up instruction is outputted from the low voltage detecting section 265, and according to this, a predetermined level of the idling-up is conducted by the engine control unit 231, and the power generation amount of the alternator is increased. Corresponding to this, in each of display sections 218, by the control of the display control section 270, the yellow light emitting element 218b is turned ON instead of the blue light emitting element 218a, thereby, the lighting color of each of light emitting areas 248 is switched from blue to yellow.

As described above, also by the present embodiment, the same effects can be obtained, and while the engine 257 is stopped by the en-st, and a predetermined electric power amount is consumed through each of feed sockets A1 and A2 and the FET 211 is turned OFF, the lighting color of the light emitting areas 248 corresponding to each of feed sockets A1 and A2 is switched to yellow, and because it is displayed that the engine 257 is stopped, the user can easily confirm that the consumed electric power is to be saved by the stop of the engine 257, and can previously recognize that the feed sockets A1 and A2 are shut down, when the predetermined electric power amount is consumed, thereby the user can take an appropriate counter measure.

Incidentally, in each of above embodiments, the start and the stop of the engine 257 is detected according to the L signal of the regulator IC 221, however, the stop of the engine 257 may be detected by detecting the switching of ON and OFF of the ignition switch.

Further, in the sixth embodiment, after the stop of the engine 257, when the predetermined electric power amount is consumed through the feed sockets A1 and A2, the feed sockets A1 and A2 are shut down, however, after the stop of the engine 257, the feed sockets A1 and A2 may be shut down when a predetermined delay time has passed. In this case, the measuring of the predetermined delay time is conducted by the engine stop detecting section 259, and after the stop of the engine 257, before the predetermine delay time has passed, when the engine 257 is started again, the measuring operation of the delay time is cancelled, and the shutdown of the feed sockets A1 and A2 is not conducted.

According to the inventions described in the sixth aspect and the tenth aspect, when the current supplied from the feed sockets is the over current, and the feed sockets are shut down by the shutdown section, because the first annunciation output is outputted through the annunciation section by the annunciation control section, the user can recognize that the feed sockets are shut down, and can take an appropriate counter measure.

According to the inventions described in the seventh aspect and the tenth aspect, when the output voltage of the battery is lowered lower than the predetermined reference level, because the first annunciation output is outputted through the annunciation section by the annunciation control section, the user can recognize that the feed sockets are shut down, and can take an appropriate counter measure.

According to the inventions described in the eighth aspect and the tenth aspect, when the current value supplied from the feed sockets exceeds the predetermined idling-up reference and the idling-up instruction is outputted by the idling-up instruction section, because the second annunciation output is outputted through the annunciation section by the annunciation control section, the user can recognize that the idling-up is conducted, and can take an appropriate counter measure such as the saving of the consumption electric power.

According to the inventions described in the ninth aspect and the tenth aspect, when the engine is stopped, because the third annunciation output is outputted through the annunciation section by the annunciation control section, the user can recognize that the engine is stopped, and can take an appropriate counter measure such as the saving of the consumption electric power, and when the engine is stopped, or after the predetermined delay processing after the engine is stopped, the user can previously recognize that feed sockets are shut down.

According to the invention of the eleventh aspect, after the engine is stopped, when the predetermine electric power amount as the reference is supplied through the feed sockets, and the feed sockets are shut down by the shutdown section, because the first annunciation output is outputted through the annunciation section by the annunciation control section, the user can recognize that the feed sockets are shut down, and can take an appropriate counter measure.

What is claimed is:

1. An automobile power source monitor by which a power supply condition is monitored when electric power from a battery is supplied to one or more electric devices through a feed socket provided in a car,
said automobile power source monitor comprising:
a shutdown section to shut down the feeding path on a feeding path between the battery and the feed socket;
an engine stop detecting section for detecting the engine stop and for making said shutdown section shut down the feeding path, wherein
when said engine stop detecting section detects the engine stop, said engine stop detecting section starts a counting operation for a predetermined time, and
as the counting operation of the predetermined time is completed, the feeding path is shut down by said shutdown section.

2. The automobile power source monitor according to claim 1, wherein
said engine stop detecting section detects the stop of the engine according to an output signal of a regulator IC.

3. The automobile power source monitor according to claim 1, wherein
said engine stop detecting section detects the stop of the engine by detecting the switching from an ON mode to indicate the operation continuance of the engine of an ignition switch to another mode to indicate the stop of the engine.

4. An automobile power source monitor by which a power supply condition is monitored when electric power from a battery is supplied to one or more electric devices through a feed socket provided in a car,
said automobile power source monitor comprising:
a shutdown section to shut down the feeding path on a feeding path between the battery and the feed socket;
an engine stop detecting section for detecting the engine stop and for making said shutdown section shut down the feeding path, and
a current detecting section to detect the value of the current flowing through the feed socket, wherein
as said engine stop detecting section detects the stop of the engine, the current value detected by said current detecting section is integrated as the time passes, and
as the integration value exceeds a predetermined reference value, the feeding path is shut down by said shutdown section.

5. The automobile power source monitor according to claim 4, wherein,
said engine stop detecting section detects the stop of the engine according to an output signal of a regulator IC.

6. The automobile power source monitor according to claim 4, wherein
said engine stop detecting section detects the stop of the engine by detecting the switching from an ON mode to indicate the operation continuance of the engine of an ignition switch to another mode to indicate the stop of the engine.

7. An automobile power source monitor by which a power supply condition when the electric power from a battery is supplied to electric devices through a feed socket provided in a car, is monitored,
said automobile power source comprising:
on a feeding path between the battery and the feed socket, a shutdown section to shut down the feeding path;
a current detecting section to detect the current value flowing to the electric devices through the feed socket;
annunciation section by which at least any one of a sound or a light can be outputted;
a shutdown control section which judges whether the current value detected by said current detecting section is the over current, and when it is judged to be the over current, which makes said shutdown section shut down the feeding path; and
annunciation control section to output the first annunciation output though said annunciation section, corresponding to the shutdown of said shutdown section by said first shutdown control section.

8. An automobile power source monitor by which a power supply condition when the electric power from a battery is supplied to electric devices through a feed socket provided in a car, is monitored,
said automobile power source monitor comprising:
on a feeding path between the battery and the feed socket, a shutdown section to shut down the feeding path;
a voltage detecting section to detect the output voltage of the battery;
an annunciation section by which at least any one of a sound or a light can be outputted;
a shutdown control section which judges whether the voltage value detected by said voltage detecting section is lowered lower than a predetermined reference level, and which makes said shutdown section shut down the feeding path when it is judged to be lower; and
an annunciation control section to output said first annunciation output through said annunciation section, corresponding to the shutdown of said shutdown section by said second shutdown control section.

9. An automobile power source monitor by which a power supply condition when the electric power from a battery is supplied to electric devices through a feed socket provided in a car, is monitored, said automobile power source monitor comprising:
- on a feeding path between the battery and the feed socket, a shutdown section to shut down the feeding path;
- a current detecting section to detect the current value flowing to the electric devices through the feed socket;
- an annunciation section by which at least any one of a sound or a light can be outputted;
- an idling-up instruction section to judge whether the current value detected by said current detecting section is over than a predetermined idling-up reference, and to output the idling-up instruction to an engine control unit when it is judged to be over; and
- an annunciation control section to output an annunciation output through said annunciation section, corresponding to the output of the idling-up instruction by said idling-up instruction section.

10. An automobile power source monitor by which a power supply condition when the electric power form a battery is supplied to electric devices through a feed socket provided in a car, is monitored, said automobile power source monitor comprising:
- an annunciation section by which at least any one of a sound or a light can be outputted;
- an engine stop detecting section to detect the engine stop, and when the engine stop is detected, following the engine stop, which may include a predetermined delay processing, to make the shutdown section shut down the feeding path; and
- an annunciation control section to output an annunciation output through said annunciation section, corresponding to the detection of the engine stop by said engine stop detecting section.

11. An automobile power source monitor by which a power supply condition when electric power from a battery is supplied to one or more electric devices through a feed socket provided in a car, is monitored, said automobile power source monitor comprising:
- on a feeding path between the battery and the feed socket, a shutdown section to shut down the feeding path;
- a current detecting section to detect the current value flowing to the electric devices through the feed socket;
- a voltage detecting section to detect the output voltage of the battery;
- an annunciation section by which at least any one of a sound or a light can be outputted;
- a first shutdown control section which judges whether the current value detected by said current detecting section is the over current, and when it is judged to be the over current, which makes said shutdown section shut down the feeding path;
- a second shutdown control section which judges whether the voltage value detected by said voltage detecting section is lowered lower than a predetermined reference level, and which makes said shutdown section shut down the feeding path when it is judged to be lower;
- an idling-up instruction section to judge whether the current value detected by said current detecting section is over than a predetermined idling-up reference, and to output the idling-up instruction to an engine control unit when it is judged to be over;
- an engine stop detecting section to detect the engine stop, and when the engine stop is detected, following the detection, or after a predetermined delay processing, which makes said shutdown section shut down the feeding path; and
- an annunciation control section to output a first annunciation output through said annunciation section, corresponding to the shutdown of said shutdown section by said first and second shutdown control sections, to output a second annunciation output through said annunciation section, corresponding to the output of the idling-up instruction by said idling-up instruction section, and to output a third annunciation output through said annunciation section, corresponding to the detection of the engine stop by said engine stop detecting section.

12. The automobile power source monitor according to claim 11, wherein
said engine stop detecting section, following the detection of the engine stop, integrates the current value detected by said current detecting section as the time passage, and as the integrated value exceeds a predetermined reference value, makes said shutdown section shut down the feeding path; and
said annunciation section further comprises:
- a function to output said first annunciation output through said annunciation section, corresponding to the shutdown of said shutdown section by said engine stop detecting section.

13. An automobile power source monitor by which a power supply condition is monitored when electric power from a battery is supplied to one or more electric devices through a feed socket provided in a car, said automobile power source monitor comprising:
- a shutdown section to shut down the feeding path on a feeding path between the battery and the feed socket; and
- an engine stop detecting section for detecting the engine stop and for making said shutdown section shut down the feeding path, when the engine stop is detected, wherein
    said engine stop detecting section detects the stop of the engine according to an output signal of a regulator IC.

14. An automobile power source monitor by which a power supply condition is monitored when electric power from a battery is supplied to electric devices through a feed socket provided in a car, said automobile power source monitor comprising:
- a shutdown section to shut down the feeding path on a feeding path between the battery and the feed socket; and
- an engine stop detecting section for detecting the engine stop and for making said shutdown section shut down the feeding path, when the engine stop is detected, wherein
    said engine stop detecting section detects the stop of the engine by detecting the switching from an ON mode to indicate the operation continuance of the engine of an ignition switch to another mode to indicate the stop of the engine.

* * * * *